US011666008B2

(12) United States Patent
Megerson et al.

(10) Patent No.: US 11,666,008 B2
(45) Date of Patent: Jun. 6, 2023

(54) SYSTEMS AND METHODS OF IMPROVED PLANT CULTIVATION AND ELONGATE AIRFLOW ASSEMBLY FOR THE SAME

(71) Applicant: AIRFIXTURE LLC, Kansas City, KS (US)

(72) Inventors: James E. Megerson, Shawnee, KS (US); Michael J. McQueeny, Jr., Leawood, KS (US); Suwan Cho, Lenexa, KS (US)

(73) Assignee: AIRFIXTURE LLC, Kansas City, KS (US)

( * ) Notice: Subject to any disclaimer, the term of this patent is extended or adjusted under 35 U.S.C. 154(b) by 0 days.

(21) Appl. No.: 17/471,141

(22) Filed: Sep. 9, 2021

(65) Prior Publication Data

US 2022/0071106 A1 Mar. 10, 2022

Related U.S. Application Data

(60) Provisional application No. 63/076,276, filed on Sep. 9, 2020.

(51) Int. Cl.
  *A01G 9/24* (2006.01)
  *F04D 29/46* (2006.01)
  *F04D 29/42* (2006.01)
  *F04D 17/16* (2006.01)

(52) U.S. Cl.
  CPC .............. *A01G 9/24* (2013.01); *F04D 17/16* (2013.01); *F04D 29/4226* (2013.01); *F04D 29/462* (2013.01)

(58) Field of Classification Search
  CPC .............. F04D 17/00; F04D 17/16–168; A01G 9/24–247
  See application file for complete search history.

(56) References Cited

U.S. PATENT DOCUMENTS

| 8,864,447 B1 * | 10/2014 | Humphrey | ............ F04D 25/088 415/118 |
| 2009/0214341 A1 * | 8/2009 | Craig | ...................... F04D 25/08 416/182 |

FOREIGN PATENT DOCUMENTS

GB 997196 * 7/1965

OTHER PUBLICATIONS

"Acme Fan-Jet," U.S. Global Resources, Accessed Apr. 1, 2022, <https://www.usgr.com/fans/acme_fanjet>, 10 pages.

(Continued)

*Primary Examiner* — Woody A Lee, Jr.
*Assistant Examiner* — Brian O Peters
(74) *Attorney, Agent, or Firm* — Shook, Hardy & Bacon L.L.P.

(57) ABSTRACT

An elongate air delivery assembly having a housing extending between two end caps. The housing includes a plurality of exit vents from which airflow is provided in a consistent sheet at a uniform velocity, and the housing is rotatable about a central longitudinal axis to change a direction of the airflow. A method of improving plant cultivation includes positioning one or more elongate air delivery systems adjacent rows of plants such that the sheet of air generated by the elongate air delivery system is directed horizontally across the plants underneath their plant canopy.

20 Claims, 14 Drawing Sheets

(56) References Cited

OTHER PUBLICATIONS

"Fan Jet Air Distribution System," Acme Engineering & Manufacturing Corp., Sep. 2000, <www.acmeag.com>, 2 pages.
"Selection and Design of Air Curtains," Bright Hub Engineering, May 2010, <https://www.brighthubengineering.com/hvac/72430-how-to-select-air-curtains-or-air-doors/>, 5 pages.

* cited by examiner

SYSTEMS AND METHODS OF IMPROVED PLANT CULTIVATION AND ELONGATE AIRFLOW ASSEMBLY FOR THE SAME

CROSS-REFERENCE TO RELATED APPLICATIONS

This application claims the benefit of U.S. Provisional Application No. 63/076,276 filed Sep. 9, 2020, and title "SYSTEMS AND METHODS OF IMPROVED PLANT CULTIVATION AND ELONGATE AIR ASSEMBLY FOR THE SAME," the contents of which are incorporated herein by reference in the entirety.

STATEMENT REGARDING FEDERALLY SPONSORED RESEARCH OR DEVELOPMENT

Not applicable.

BRIEF SUMMARY OF THE INVENTION

The present invention generally relates to improvements in plant cultivation. More particularly, this invention relates to systems and methods, as well as an elongate airflow assembly, for optimizing and/or improving growing conditions of an environment in which plants are grown. The systems and methods may utilize the elongate airflow assembly, which may be configured to provide controllable and/or selectable air flow (e.g., adjustable direction and/or air velocity) to one or more plants. In one embodiment the elongate airflow assembly provides a consistent sheet of air at a uniform velocity. Moreover, the elongate airflow assembly may be further configured for ease of use and/or compatibility with different growing environments (e.g., detachably mountable and/or repositionable on multiple types of grow racks, accessibility for cleaning, repair, and/or part replacement, low voltage power supply, and the like). As such, the elongate airflow assembly is suitable for regulating air circulation of an indoor grow environment in a localized manner that optimizes growing conditions and is also adaptable for improving plant cultivation in a variety of different grow environments, such as those that include multiple types of grow racks and/or spatial constraints.

Systems, methods, and devices for altering growing conditions of an environment in which plants are grown are well known in the art. In particular, the prior art discusses devices that relate to air circulation in indoor grow environments (e.g., greenhouse, indoor grow rooms, and the like) such as HVAC systems (e.g., raised floor systems, overhead duct systems, central air systems, and the like) and/or fans (e.g., floor standing, ceiling, and the like). These HVAC systems and industrial fans provide high volumes of air flow, but do not do so at a consistent velocity. For example, industrial fans provide air flow in a cylindrical pattern. The air flow in the middle is not the same velocity as the air flow around the edges of the cylindrical pattern. As a result, some plants get too much air (e.g., over 250 ft/min velocity), which creates wind burn, and some plants do not get enough air, which can result in high humidity micro-climates that can lead to mold, mildew, and rot. Further, these prior art devices generally distribute air from a source at a fixed location (e.g., exit vents of air ducts, exit vents overtop rotating fan blades, and the like) and then flows through large spaces of an indoor grow environment. Because plants and/or grow racks are at different locations in the spaces of an indoor grow environment through which air flows, air distributed from a same source flows to the plants at different locations in differing manners (e.g., volume, velocity, direction, and the like), and for at least some of the plants, the flow of air may be indirect and/or disrupted. Consequently, the air flow to plants located in the same or different spaces of the indoor grow environment is non-uniform, inconsistent, and/or unpredictable. As such, the HVAC systems and fans discussed by the prior art are not capable of providing controllable and/or selectable air flow and thus are not suitable for regulating air circulation in a localized manner to optimize growing conditions for one or more plants being grow in indoor environments.

Additionally, the HVAC systems and fans discussed by the prior art may be unsuitable for a variety of different grow environments for other reasons, namely they are typically difficult to clean, are difficult to move, and/or require high voltage power. For instance, when one or more plants of a grow environment are contaminated, these HVAC systems and fans may be problematic and if improperly maintained and/or cleaned, could contribute to a spreading of contamination and/or recontamination. Moreover, the prior art HVAC systems distribute air flow from exit vents that have fixed locations in walls, floors, and/or ceilings of a room and thus relocating the exit vents and/or adding additional exit vents so that air flow is distributed from a different location generally requires substantial undertakings and/or costs. Some of the prior art fans (e.g., ceiling fans) have fixed locations and thus are deficient in this same way. While the other prior art fans (e.g., floor-standing fans) may be moved from one location to another, a size of these fans and/or spatial constrains of a grow environment (e.g., minimal distance separating one or more grow racks) may prohibit the fans from being moved to more desirable locations. Notwithstanding, even if these prior art fans were moveable to such locations, they would likely still be unsuitable for a variety of different grow environments since the volume and air velocity of the air flow widely inconsistent across the air flow regardless of their location. Further, due to their high voltage requirements, the prior art HVAC systems and fans may be unsafe when operated around water and/or in damp or wet environments, like, for example, while watering plants. Accordingly, the HVAC systems and fans discussed by the prior art are not easily useable and compatible and thus are not adaptable for improving plant cultivation in a variety of different growing environments.

Furthermore, although not discussed in relation to air circulation of indoor grow environments, the prior art also discusses devices such as air curtain fans that provide air flow across a doorway or large opening to prevent air and/or contaminants from passing therethrough. Such devices are designed to provide air flow in a manner that forms an air barrier, which requires air to flow in a single, uniform direction and at a sufficiently high air velocity. To achieve this functionality, the devices are permanently mounted above the doorway or large opening and are equipped with components (e.g., diffusers, grates, fans, motors, and the like) that limit the flow of air to one direction and to relatively high air velocities. As a result, these prior art devices are not capable of providing controllable and/or selectable air flow or of being detachably mounted and/or repositioned on a grow rack and, therefore, are not suitable for regulating air circulation of an indoor grow environment in a localized manner that optimizes growing conditions or for improving plant cultivation in a variety of different grow environments.

Accordingly, the present invention provides improvements over the prior art as the elongate airflow assembly, as well as the systems and methods that utilizing the same, may be capable of providing controllable and/or selectable air flow and may also be capable of being easily used and/or compatible with different grow environments. The elongate air flow assembly can create and deliver a consistent sheet of air across a wide area at a uniform velocity. The sheet of air may then be directed horizontally across several rows of plants underneath the plant canopy to create a vapor pressure deficit (VPD). With a significant, but not too high, VPD, the plants more readily absorb water through their root system and improve growth rate. In some embodiments an optimal VPD can be formed with an air velocity of 50-150 ft/min. Other benefits of consistent ventilation under the canopy is to prevent high humidity micro-climates that can form in high density grow racks. This method prevents mold and powdery mildew, as well as increases resistance to pests. In more detail, the elongate airflow assembly includes a first end, a second end opposite the first end, a housing extending between the first and second ends and including a plurality of intake slots and a plurality of exit vents, and a plurality of fans including a plurality of blades that are rotatable about a fan axis in a first rotational direction. When the plurality of fan blades are rotated in the first rotational direction, air flows though the plurality of intake slots in a first airflow direction and flows through the plurality of exit vents in a second airflow direction that is, in some embodiments, generally perpendicular to the first airflow direction.

In example aspects, the elongate airflow assembly is configured to provide controllable and/or selectable air flow. Such aspects contemplate that the housing is configured to be rotatable about a first central longitudinal axis that extends through a center of the housing and between the first and second ends to alter and/or change a position of the plurality of exit vents, which, in turn, alters and/or changes an orientation at which air exits the elongate airflow assembly, and, thus, the direction of airflow. These aspects further contemplate that the plurality of fans are configured to rotate their respective pluralities of blades at multiple speeds, which may be selected and/or adjusted to provided air flow at a desired air velocity.

Another example aspect contemplates that the housing of the elongate airflow assembly is configured such that it may be quickly and easily opened to provide convenient access for cleaning, maintenance, repair, and the like. In this aspect, the housing may comprise a top or first shell and a bottom or second shell that are hingedly attached and configured such that the top shell may be moveable into and between a first position (i.e., the elongate airflow assembly in a closed, operable state) and a second position (i.e., the elongate airflow assembly is in an open, inoperable state).

Further objects, features and advantages of the present invention over the prior art will become apparent from the detailed description of the drawings which follows, when considered with the attached figures.

BRIEF DESCRIPTION OF THE SEVERAL VIEWS OF THE DRAWINGS

The features of the invention noted above are explained in more detail with reference to the embodiment illustrated in the attached drawing figures, in which like reference numerals denote like elements, in which FIGS. 1A-6 illustrate possible embodiments of the present invention, and in which:

FIG. 1A is a top, front perspective view of an example elongate airflow assembly, in accordance with aspects herein;

FIG. 5 is a top right perspective view of a system of improved plant cultivation; and FIG. 6 is a flow chart depicting steps of a method of improved plant cultivation.

DETAILED DESCRIPTION OF THE INVENTION

Figure 1A:
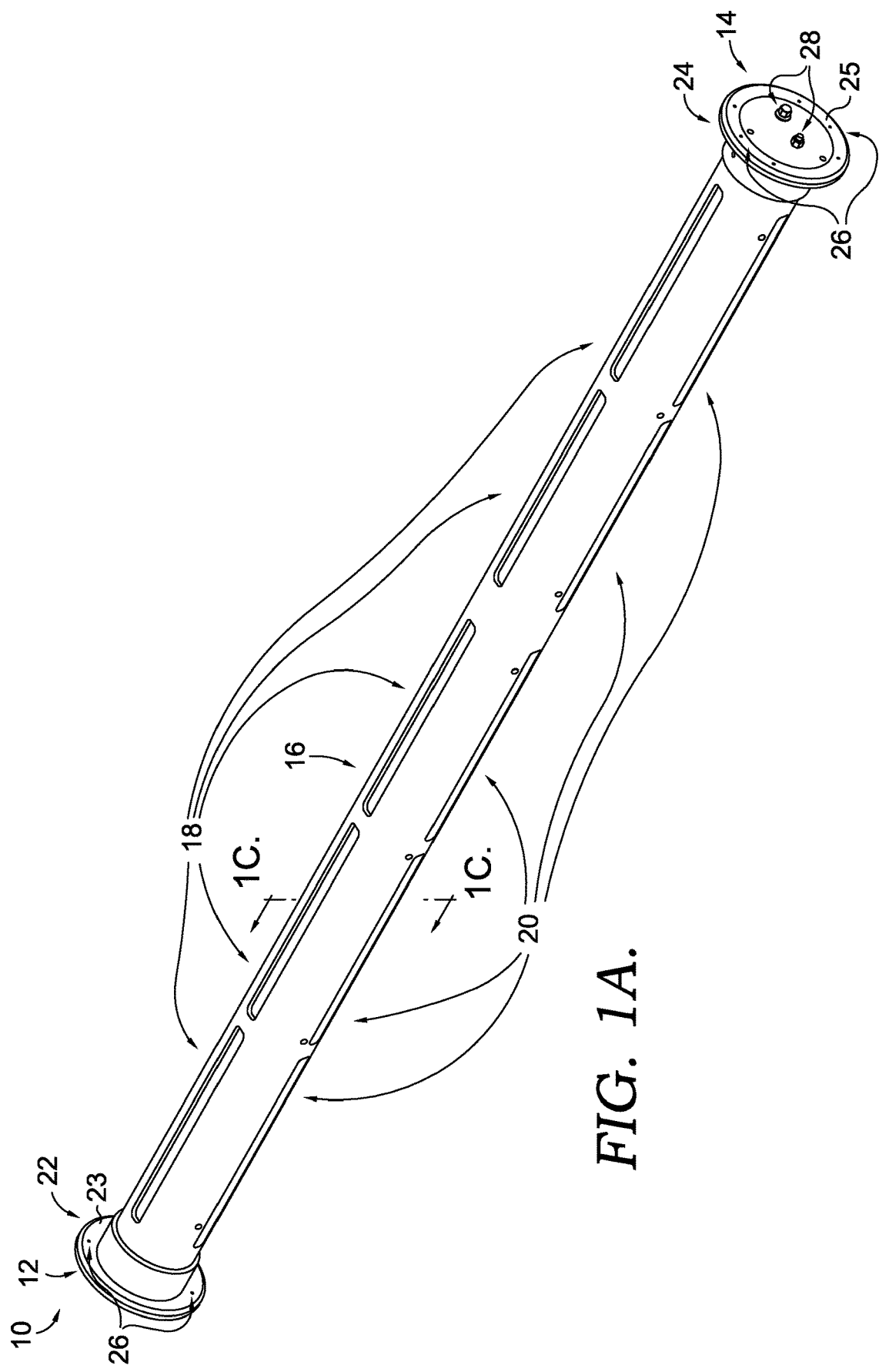

Referring now to the drawings in more detail, and initially to FIG. 1A, which is a top right, front perspective view of an example elongate airflow assembly 10 including a first end 12, a second end 14 opposite the first end 12, and a housing 16 extending between the first and second ends 12, 14. The housing 16 is cylindrically shaped and is configured to be connected with a first end cap 22 at the first end 12 and a second end cap 24 at the second end 14. In other examples, the housing 16 may have a shape that includes straight edges such that the housing has a cross sectional shape of a rectangle, pentagon, hexagon, heptagon, octagon, enneagon, decagon, and the like. Both of the first and second end caps 22, 24 are configured to have a shape that is capable of receiving the housing 16, and in this example, the first and second end caps 22, 24 include a flat circular portion and a cylindrical portion extending therefrom that receives the housing 16. The first and second end caps 22, 24 each include one or more mounting components 26 that are configured such that the elongate airflow assembly 10 may be mounted to a grow rack near the first end 12, the second end 14, or both. It should be noted that "mounted" includes not only direct coupling mounting, but also indirect coupling mounting, such as by hanging by a chain. Moreover, the flat circular portion of the first end cap 22 includes a first perimeter portion 23 and a first interior portion, and likewise, the flat circular portion of the second end cap 24 includes a second perimeter portion 25 and a second interior portion. The first and second perimeter portions 23, 25 have a circular shape and respectively encircle the first and second interior portions.

In some aspects, the one or more mounting components 26 may be configured to be coupled with one or more mounting components of an additional elongate airflow assembly such that multiple elongate airflow assemblies may be coupled to one another and/or mounted on a grow rack. Additionally, at least one of the end caps (e.g., the second end cap 24 in the illustrated embodiment) includes one or more ports 28 that are configured to receive a power supply that powers the elongate airflow assembly 10 and components thereof. In some embodiments, both end caps have ports 28 so multiple elongate airflow assemblies 10 can be coupled together in a daisy chain arrangement to send power from one to another. In one aspect, the elongate airflow assembly 10 is configured to be fully operable when powered by a low voltage DC (e.g., 24 volts DC) power source such that the elongate airflow assembly 10 is safe for human operators, energy efficient, easy to wire, and suitable for a damp or wet environment. Whether daisy chained, in parallel, or in a star configuration, the fan speed of each elongate airflow assembly 10 is independently adjustable.

Collectively, the housing 16 and the first and second end caps 22, 24 are configured to be connected to one another such that the housing 16, as well as components therein, may be rotated about a central longitudinal axis of the elongate airflow assembly 10 that extends through a center of the housing 16 and between the first and second ends 12, 14. The housing 16 includes a plurality of intake slots 18 and a plurality of exit vents 20, which are configured to cooperatively direct a flow of air through the elongate airflow assembly 10. For example, air enters the elongate airflow assembly 10 through the plurality of intake slots 18 and exits the elongate airflow assembly 10 through the plurality of exit vents 20. Air filters (not shown) may be positioned adjacent one or more of the intake slots 18 to prevent particulate matter from entering the elongate airflow assembly 10. In aspects, the housing 16 may be rotated about the central longitudinal axis to alter and/or change a position of the plurality of exit vents 20, which, in turn, alters and/or changes the orientation at which air exits the elongate airflow assembly 10, and thus the direction of airflow.

In additional aspects, the housing 16 and the first and second end caps 22, 24 may collectively form a structure that encloses internal components of the elongate airflow assembly 10. In further aspects, the housing 16, the first end cap 22, the second end cap 24, or any combination thereof may be configured to be corrosion, water, moisture, and/or ultraviolet light resistant. As such, the housing 16, the first end cap 22, the second end cap 24, or any combination thereof may be constructed of stainless steel, galvanized powder coated steel, plastic, or some other material that is resistant to corrosion, water, moisture, and/or ultraviolet light such as polyvinyl chloride (PVC).

Figure 1B:
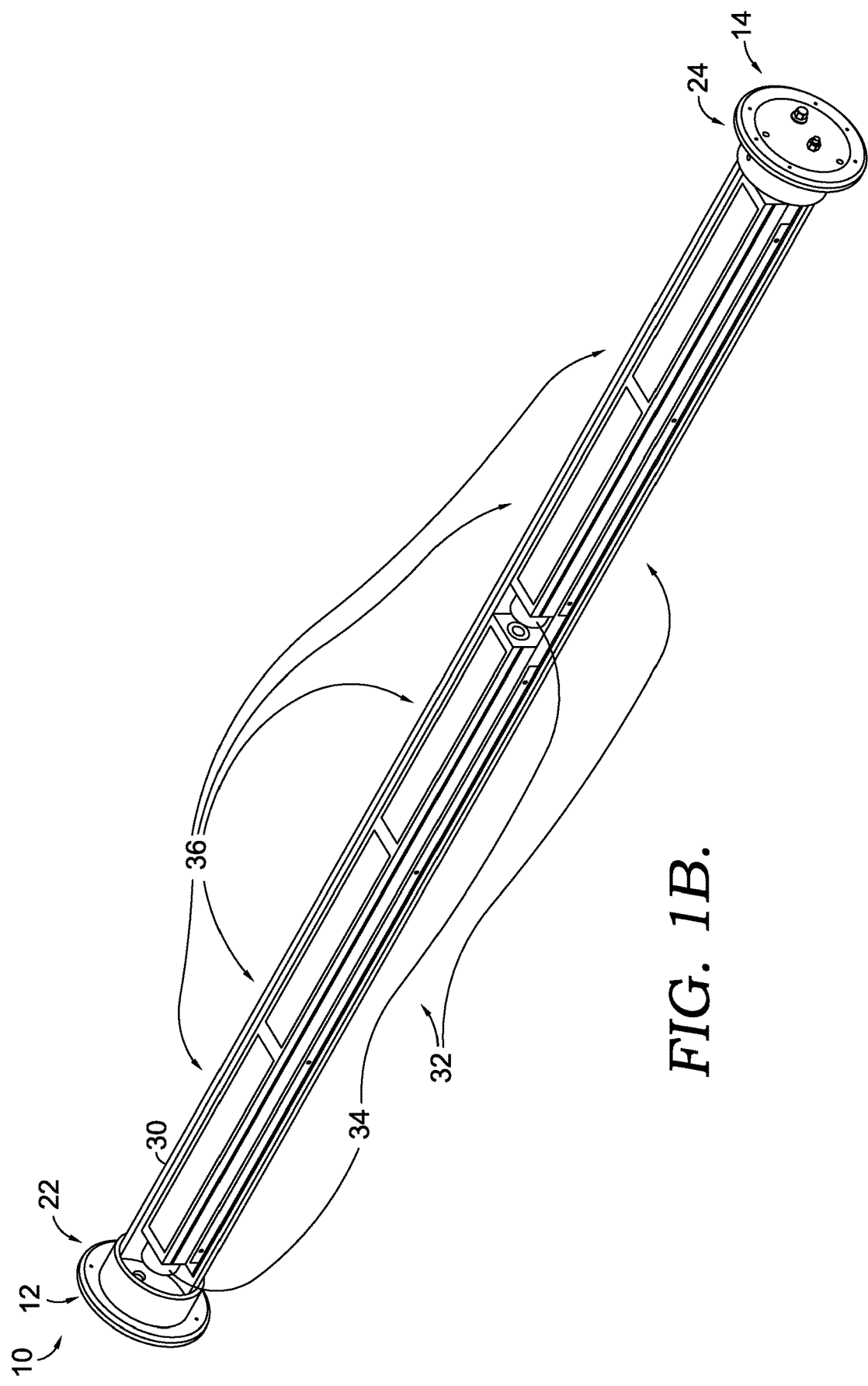
FIG. 1B is a top, front perspective view of the elongate airflow assembly of FIG. 1A with a portion of the housing removed to show internal components of the elongate airflow assembly.

FIG. 1B is a perspective view like FIG. 1A and depicts the elongate airflow assembly 10 with the housing 16 removed and shows internal components of the elongate airflow assembly 10. As can be seen, the elongate airflow assembly 10 includes a cage 30 that extends between the first and second ends 12, 14 and is coupled to an internal portion of the first and second end caps 22, 24. Although not shown, the cage 30 may also be coupled to an interior side of the housing 16. The elongate airflow assembly 10 also includes a plurality of fans 32, each of which are coupled to the cage 30 and include a motor 34 and one or more screens 36. The motor 34 of each fan of the plurality of fans 32 is positioned at an end of the fan that is distal to the second end 14 of the elongate airflow assembly 10. Each screen of the one or more screens 36 is aligned with one intake slot of the plurality of intake slots 18 of the housing 16. In example aspects, one or more fans of the plurality of fans 32 is a cross-flow fan.

Figure 1C:
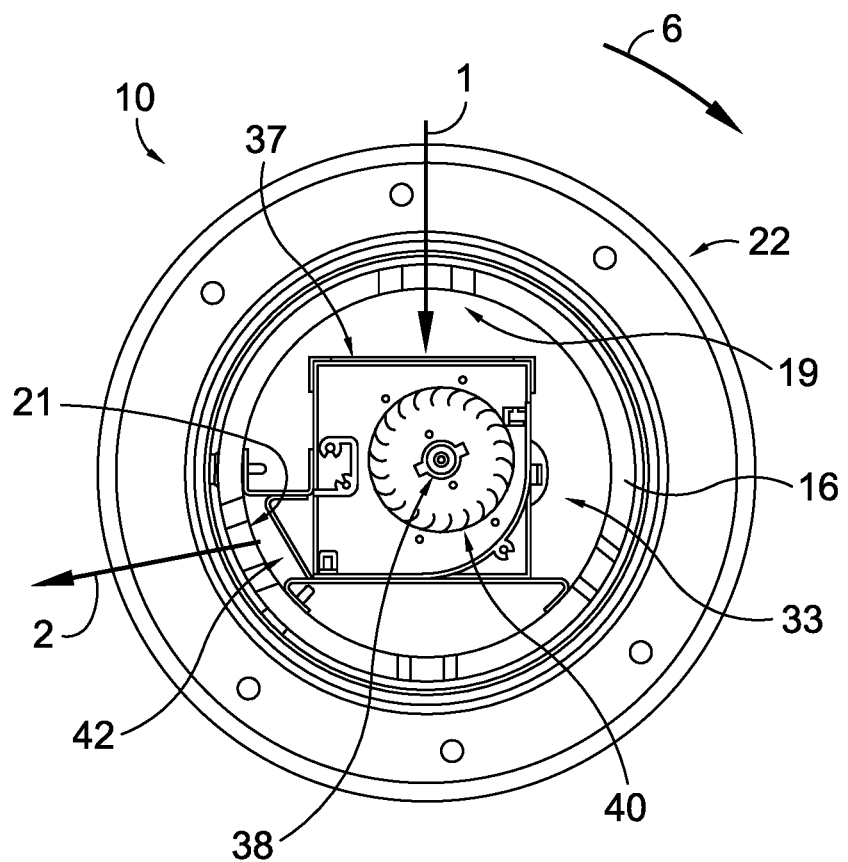
FIG. 1C is a cross-section view of the elongate airflow assembly taken along the line 1C-1C of FIG. 1A.

FIG. 1C is a cross sectional view of the elongate airflow assembly 10 taken at cut line 1C-1C of FIG. 1A. FIG. 1C depicts a portion of the elongate airflow assembly 10 between the cut line 1C-1C and the first end 12 and shows individual components of the elongate airflow assembly 10 that are included in this portion and/or located at the cut line 1C-1C. As such, FIG. 1C depicts a first intake slot 19 of the plurality of intake slots 18, a first exit vent 21 of the plurality of exit vents 20, and a first fan 33 of the plurality of fans 32 that include a first screen 37, a fan axis 38, a plurality of blades 40, and an airflow exit 42. The first screen 37 is aligned with the first intake slot 19 and forms an airflow entrance of the first fan 33. Similarly, the airflow exit 42 of the first fan 33 is aligned with the first exit vent 21. The plurality of blades 40 are arranged such that they form a circular cross sectional shape around the fan axis 38, which is parallel to the central longitudinal axis (not identified) of the elongate airflow assembly 10. The first fan 33 is configured such that the motor 34 (not shown in FIG. 1C) moves the plurality of blades 40 in a first rotational direction 6 (e.g., a clockwise direction when viewing a side of the first end cap 22 that is proximal to the housing 16, like in FIG. 1C) about the fan axis 38. When the plurality of blades 40 are rotated, air flows into the elongate airflow assembly 10 at a first airflow direction 1 and then flows out of the elongate airflow assembly at a second airflow direction 2 that is, in the illustrated embodiment, generally perpendicular to the first airflow direction 1 (e.g., within ±45 degrees of perpendicular). Moreover, air enters the elongate airflow assembly 10 through the first intake slot 19 (e.g., the plurality of intake slots 18), travels into the first fan 33 (e.g., the plurality of fans 32) through the first screen 37 (e.g., the one or more screens 36), travels out of the first fan 33 (e.g., the plurality of fans 32) through the airflow exit 42, and then exits the elongate airflow assembly 10 through the first exit vent 21 (e.g., the plurality of exit vents 20).

FIGS. 2A-4B illustrate aspects of an example elongate airflow assembly 110 of an alternate embodiment including a housing 140 that is configured to direct a flow of air into and out of the elongate airflow assembly 110 and to provide convenient access to internal components of the elongate airflow assembly for cleaning, maintenance, repair, and the like. In example aspects, the housing 140 includes a plurality of intake slots 142 and a plurality of exit vents 144 (best shown in FIG. 2B) that are configured to cooperatively direct a flow of air into and out of the elongate airflow assembly 110. Moreover, the housing 140 further includes a first shell 150 and a second shell 170 that are coupled and configured such that the first shell 150 is moveable to and between two positions (e.g., closed, like in FIGS. 2A-2F; open, like in FIGS. 3A and 3B). Before discussing aspects related to the housing 140 and features thereof in more detail, general aspects of the elongate airflow assembly 110 will first be discussed.

Figure 2A:
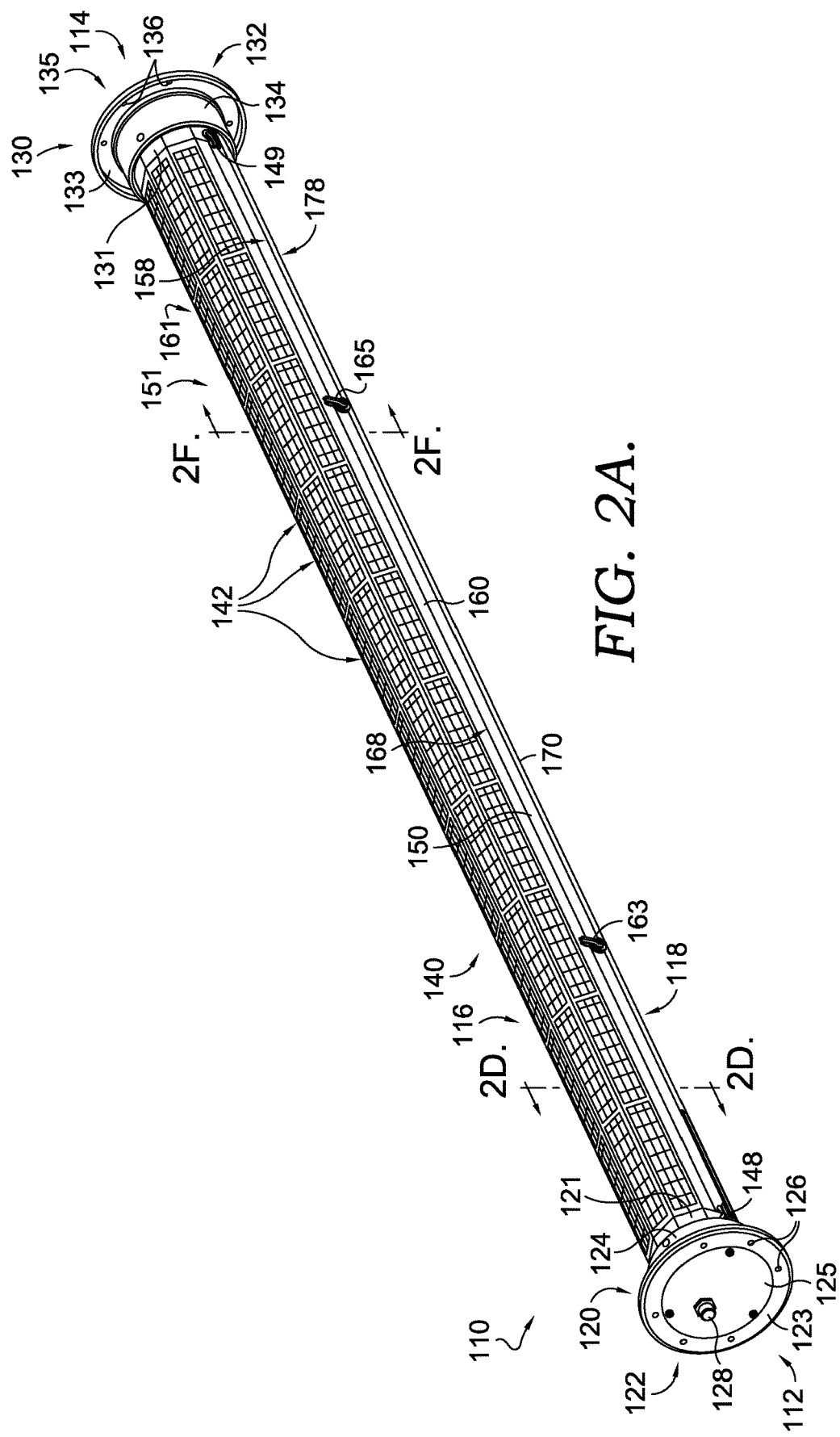
FIG. 2A is a top front perspective view of an example elongate airflow assembly that includes a housing with a first shell and a second shell, in accordance with aspects herein.
Figure 2B:
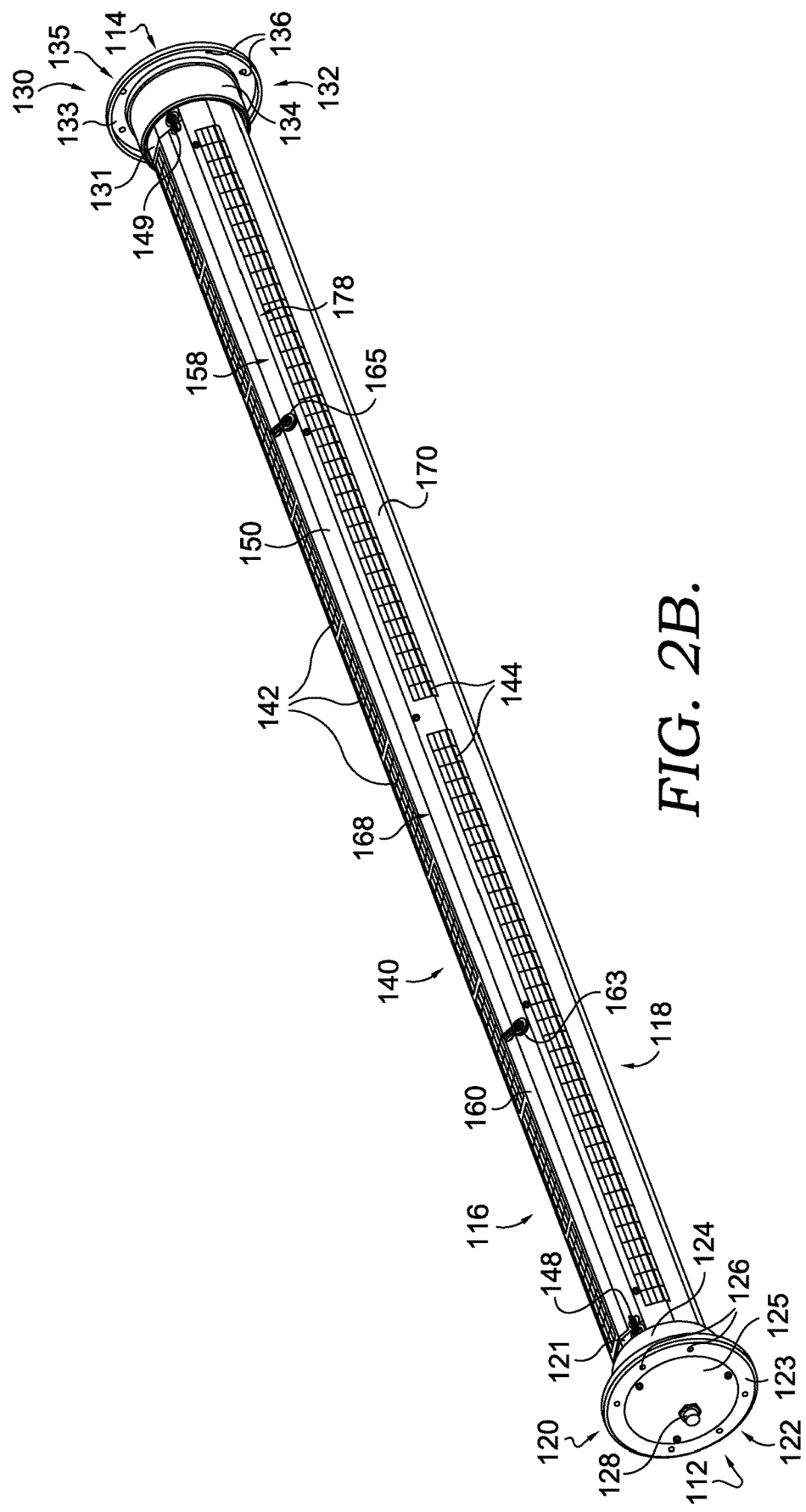
FIG. 2B is a bottom front perspective view of the elongate airflow assembly of FIG. 2A.
Figure 2C:
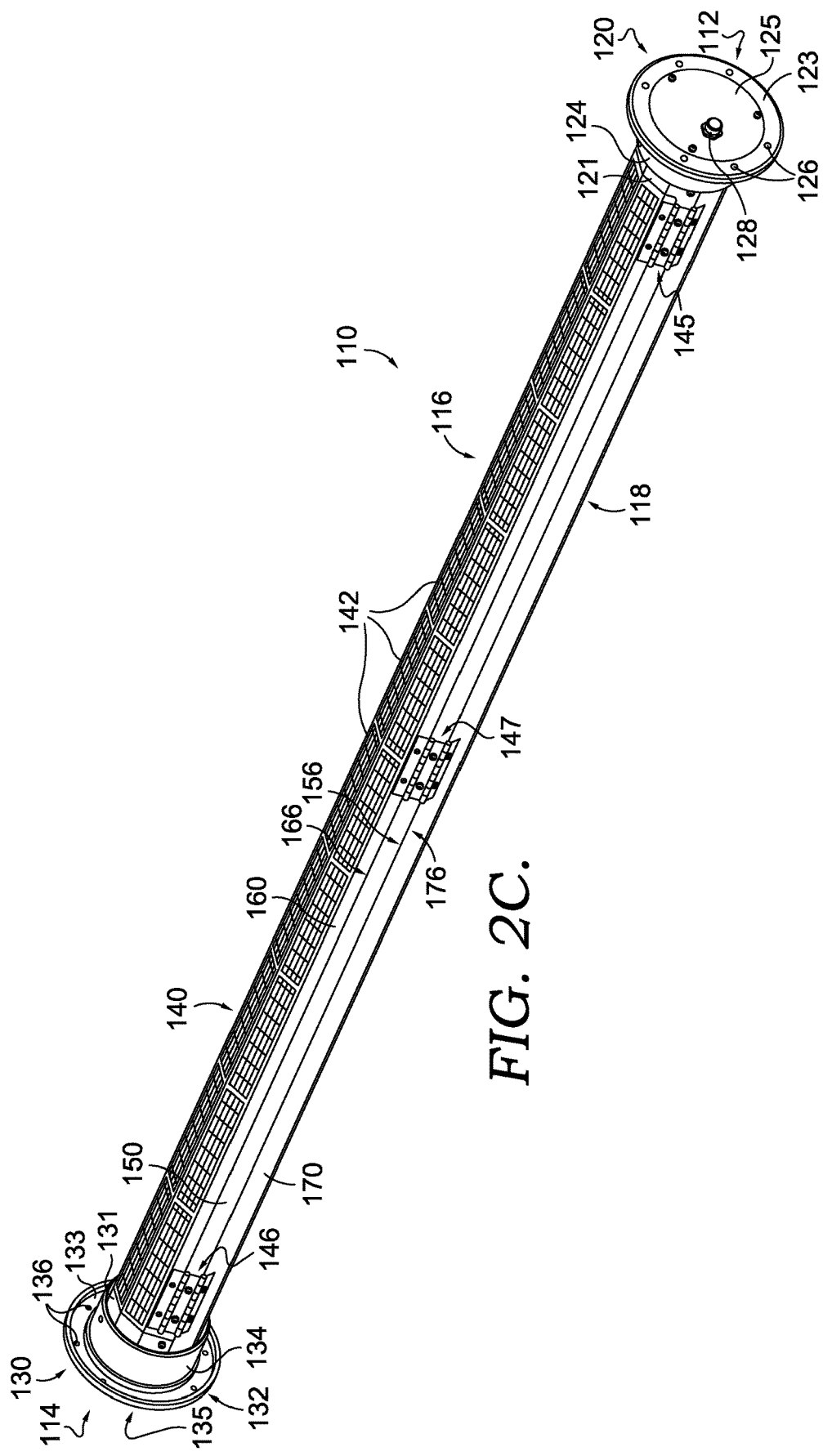
FIG. 2C is a top rear perspective view of the elongate airflow assembly of FIG. 2A.

With reference to FIGS. 2A-2C, which are perspective views, the elongate airflow assembly 110 includes a first end 112, a second end 114, a first side 116, and a second side 118, each of which refers to a general location, area, and/or region on the elongate airflow assembly 110. The first and second ends 112, 114 are opposite one another and refer to general areas between which the elongate airflow assembly 110 longitudinally extends. The first and second sides 116, 118 are also opposite one another and respectively refer to general uppermost and lowermost locations of the elongate airflow assembly 110 when oriented in an upright position, as shown in FIGS. 2A-2C. As such, the first side 116 refers to a general region that extends along a top of the elongate airflow assembly 110, and the second side refers to a general region that extends along a bottom of the elongate airflow assembly 110. In addition, because FIGS. 2A-2C depict different perspective views, a visibility of the elongate airflow assembly 110 at the first and second ends 112, 114 and the first and second sides 116, 118 is different in each of FIGS. 2A-2C. For example, FIG. 2B is a bottom, front perspective and shows more of the second side 118 of the elongate airflow assembly 110 than FIGS. 2A and 2C, which are top, front and top, rear perspective views, respectively.

The elongate airflow assembly 110 includes a first end cap 120 at the first end 112 and a second end cap 130 at the second end 114. The first and second end caps 120, 130 are configured to be capable of receiving and securing therein a respective portion of the housing 140 at each of the first and second ends 112, 114. As shown in FIGS. 2A-2C, the first end cap 120 includes a first flat circular portion 122 and a first cylindrical portion 124 extending therefrom, which receives the housing 140 at the first end 112. Similarly, the second end cap 130 includes a second flat circular portion 132 and a second cylindrical portion 134 extending therefrom, which receives the housing 140 at the second end 114. The first flat circular portion 122 includes a first perimeter portion 123 and a first interior portion 125, and the second flat circular portion includes a second perimeter portion 133 and a second interior portion 135 (not visible in FIGS. 2A-2C). The first and second perimeter portions 123, 133 have an "O" shape and respectively encircle the first and second interior portions 125, 135.

The first and second cylindrical portions 124, 134 are configured to define an opening having a shape and size that is suitable for receiving the housing 140 and that is also suitable for securing the housing 140 therein. As such, the first and second cylindrical portions 124, 134 define a circular opening with a diameter that is slightly greater than a largest dimension of the housing 140 that is being received. The housing 140 may be secured within the circular openings of the first and second cylindrical portions 124, 134 via any suitable coupling means, such as bolts, screws, rivets, and the like, and it should be appreciated by one of ordinary skill in the art that any suitable method may be used. Aspects herein contemplate that one or more features of the first and second end caps 120, 130 may be selected and/or modified to be suitable for a housing with different features than the housing 140 and/or for a desired use of the elongate airflow assembly 110. In such aspects, the first and second cylindrical portions 124, 134 may be configured to define openings having shapes and sizes that are suitable for receiving a housing that is larger, smaller, and/or of a different shape than housing 140 and that may also be suitable for securing the housing therein.

The first and second end caps 120, 130 are configured such that the elongate airflow assembly 110 may be mounted to a grow rack near the first end 112, the second end 114, or both. As such, the first end cap 120 includes a first plurality of mounting components 126, and the second end cap 130 includes a second plurality of mounting components 136. The first and second pluralities of mounting components 126, 136 are depicted as apertures on the first and second perimeter portions 123, 133, but it should be understood by one having ordinary skill in the art that the first and second pluralities of mounting components 126, 136 may be configured for any coupling means suitable for mounting the elongate airflow assembly 110 to a grow rack near the first end 112, the second end, 114, or both. Further, the first end cap 120 includes a first port 128 located on the first interior portion 125 of the first flat circular portion 122. The first port 128 is configured to receive a power supply that powers the elongate airflow assembly 110 and components thereof. In example aspects, the first port 128 is configured to receive power that is low voltage DC (e.g., 24 volts DC), and the elongate airflow assembly 110 is configured to be fully operable when powered by a low voltage DC power source. Such aspects contribute, at least in part, to the elongate airflow assembly 110 being safe for human operators, energy efficient, easy to wire, and suitable for a damp or wet environment.

Example aspects herein contemplate that the first and second end caps 120, 130 and/or the first and second pluralities of mounting components 126, 136 may be configured to be coupled with one or more mounting components of an additional elongate airflow assembly such that multiple elongate airflow assemblies may be coupled to one another and/or mounted on a grow rack. Other example aspects herein contemplate that at least one the first and second end caps 120, 130 (e.g., the first end cap 120 in FIGS. 2A-2C) includes one or more ports (e.g., the first port 128) that are configured to receive a power supply that powers the elongate airflow assembly 110 and components thereof. In one example aspect, both the first and second end caps 120, 130 are configured to include one or more ports that can be utilized to couple multiple elongate airflow assemblies together (e.g., in a daisy chain arrangement) to send power from one to another.

Additional example aspects contemplate that the first and second end caps 120, 130 are configured to include a swivel feature in which one or more parts of each of the first and second end caps 120, 130 are independently moveable relative to any of their remaining parts. In one example aspect, the first and second end caps 120, 130 are configured such that their cylindrical and interior portions (e.g., the first and second cylindrical portions 124, 134 and the first and second interior portions, 125, 135) are independently movable relative to their perimeter portions (e.g., the first and second perimeter portions 123, 133). To afford such functionality to the first end cap 120, for example, the first perimeter portion 123 may include a lip, and the first cylindrical portion 124 may include a groove with a size that permits the lip to be freely moveable therein. Moreover, the first interior portion 125 may extend over the groove and connect with the first cylindrical portion 124 in a manner that contains the lip within the grove without affecting its movability. In another example, the first perimeter portion 123 may be positioned around an end portion of the first cylindrical portion 124, both of which may be sized so that the first perimeter portion 123 is rotatable around the first cylindrical portion 124. Further, the first interior portion 125 may be connected to the first cylindrical portion 124 and partially overlap with the first perimeter portion 123. As result of both instances, the first cylindrical portion 124 and the first interior portion 125 are moveable independent of the first perimeter portion 123 and vice versa. Similar features may be included in the second end cap 130, as well as the first and second end caps 22, 24, to afford the same functionality. This allows the elongate airflow assembly 110 to be mounted to a growing rack (e.g., in FIG. 5), or hung by chains therefrom, by one or more of the first and second pluralities of mounting components 126, 136 in the first and second perimeter portions 123, 133, but still allow the operator of the elongate airflow assembly 110 to change the direction air flows from the elongate airflow assembly 110 by rotating the housing 140. The operator can rotate the housing 140 until the air flow from the elongate airflow assembly 110 is horizontal such that it is directed across all of the plants adjacent thereto on a particular shelf of a grow rack. The operator may also make multiple small rotations of the housing 140 to accommodate the changes in canopy height as the plants grow without having to unmount the elongate airflow assembly 110 from the grow rack.

Figure 3A:
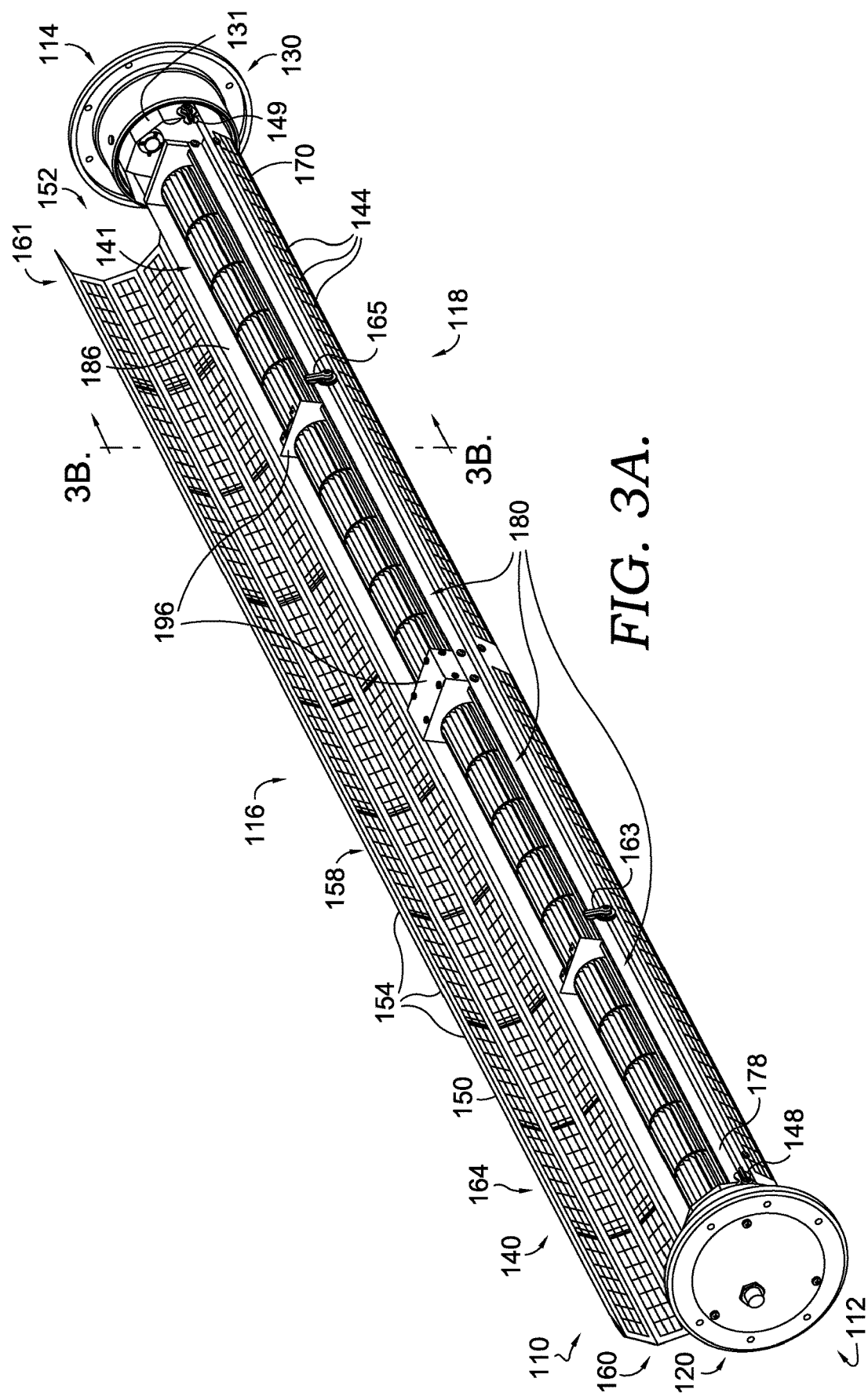
FIG. 3A is a top front perspective view of the elongate airflow assembly of FIG. 2A depicting the first shell in an open position.

Turning now to the housing 140, and with additional reference to FIG. 3A, it includes an internal compartment 141 that is configured to house internal components of the elongate airflow assembly 110. The internal compartment 141 may be configured to include one or more features for housing, mounting, retaining, supporting, and/or securing a variety of internal components of the elongate airflow assembly 110. Moreover, such features may be selectively included so that the internal compartment 141 is suitable for a particular type of internal component. In this example, the elongate airflow assembly 110 includes a plurality of fans 180, and the internal compartment 141 includes retention structures 186 that longitudinally extend between the first and second ends 112, 114 and/or laterally extend within the internal compartment 141. The retention structures 186 are coupled to an interior of each of the first and second end caps 120, 130 and are also coupled to an interior of the housing 140. The plurality of fans 180 are coupled to the retention structures 186 in a manner that retains their position relative to the housing 140. Additional aspects related to the plurality of fans 180 are later discussed.

Figure 2D:
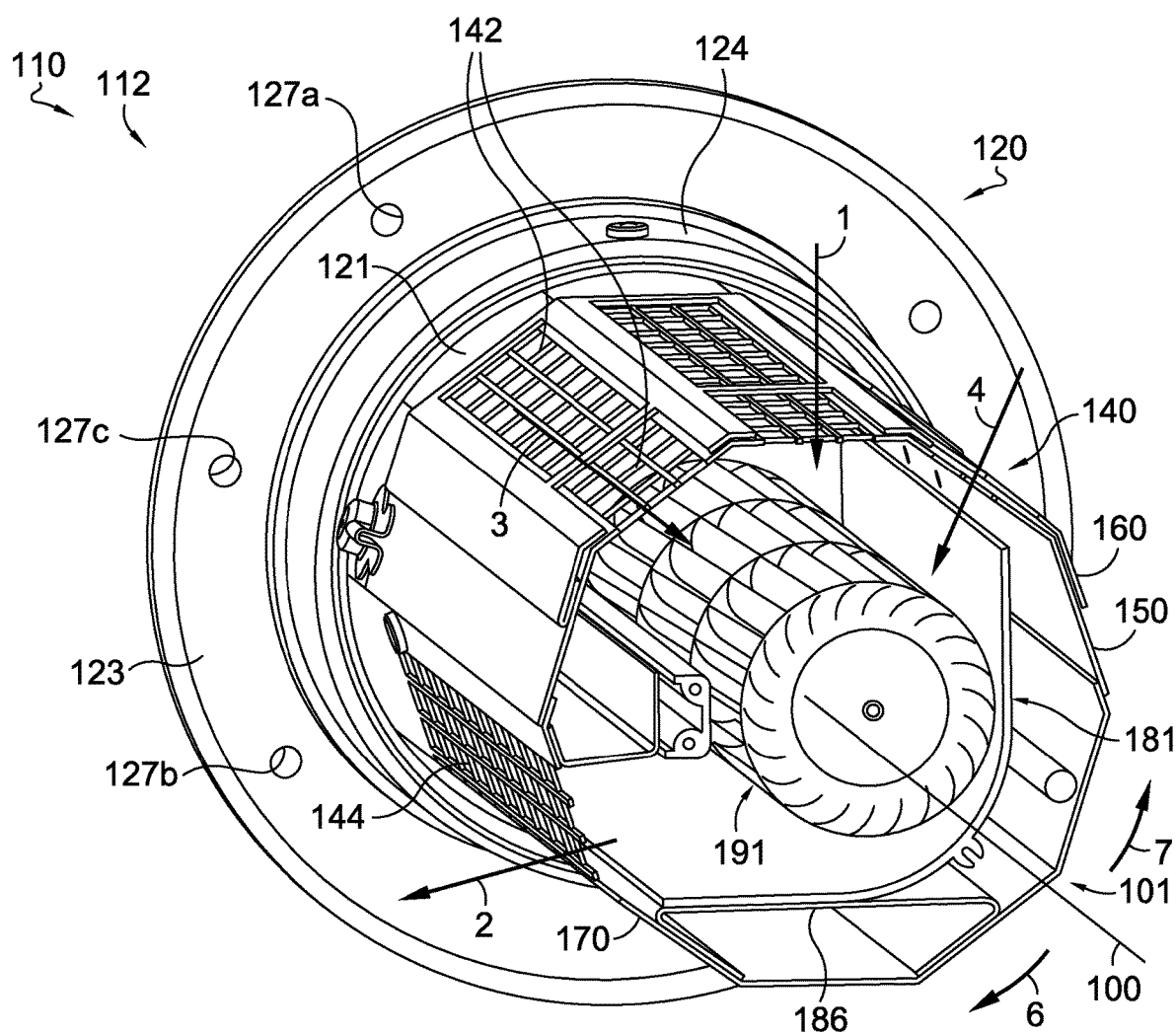
FIG. 2D is a perspective cross-sectional view of the elongate airflow assembly of FIG. 2A taken along the line 2D-2D of FIG. 2A.

With further reference now to FIG. 2D, which shows an elevated cross-sectional view taken at cut line 2D-2D of FIG. 2A, the housing 140 extends between the first and second ends 112, 114 and is configured to connect with the first end cap 120 at the first end 112 and the second end cap 130 at the second end 114. Moreover, the housing 140, in this illustrated exemplary embodiment, has an elongate shape with ten planar sides that form straight edges proximate the first and second ends 112, 114 and a cross sectional shape of a decagon. Moreover, all of the sides have similar dimensions (e.g., length, width), and each side forms a substantially similar angle with an adjacent side. Aspects herein contemplate that a shape the housing 140 may be different than the example illustrated in FIGS. 2A-4B. Such aspects contemplate that a shape of the housing 140 may be a cylindrical, like the housing 16, or may have a shape with more or less than ten sides, one or more curved or straight sides, one or more sides of different sizes, or sides that form a cross sectional shape of a rectangle, pentagon, hexagon, heptagon, octagon, enneagon, and the like.

As previously mentioned, the housing 140 includes the first and second shells 150, 170 and also includes a first end portion 121 and a second end portion 131. When the housing 140 and the elongate airflow assembly 110 are oriented in the manner shown in FIGS. 2A-2D, the first end portion 121, the second end portion 131, and the first shell 150 collectively form an upper half of the housing 140 and include the five planar sides of the housing 140 that are most proximal to the first side 116. The first end portion 121 is proximate the first end 112 and is received by and secured within the first cylindrical portion 124 of the first end cap 120. Similarly, the second end portion 131 is proximate the second end 114 and is received by and secured within the second cylindrical portion 134 of the second end cap 130. The first shell 150 includes a first and second edge (not identified) that respectively abut an edge of the first end portion 121 and an edge of the second end portion 131. The second shell 170 forms a lower half of the housing 140 and includes the five planar sides that are proximal to the second side 118. The second shell 170 continuously extends between the first and second ends 112, 114 and is received by and secured within the first cylindrical portion 124 of the first end cap 120 at the first end 112 and the second cylindrical portion 134 of the second end cap 130 at the second end 114.

In example aspects, the housing 140 includes a filter cage 160 that is configured to be positionable overtop a portion of the first shell 150 such that an air filter may be positioned adjacent to the plurality of intake slots 142. The air filter (not identified) prevents particulate matter from entering the elongate airflow assembly 110. Generally, the filter cage 160 longitudinally extends between the first and second end portions 121, 131 of the housing 140 and has a structure that is similar in shape to, but slightly larger than, a structure of the first shell 150. Further, the filter cage 160 may be configured to include a built-in air filter and/or to releasably retain a temporary air filter. Aspects herein contemplate that the filter cage 160 may be integral to the first shell 150 or that the filter cage 160 and the first shell 150 may be separate, individual components of the housing 140. However, it is to be understood that these descriptions are not limiting and that any features and/or aspects of the first shell 150 discussed apart from or without reference to the filter cage 160 are applicable to any configuration of the first shell 150 contemplated herein.

Turning now to aspects related to airflow, the plurality of intake slots 142 and the plurality of exit vents 144 (best shown in FIGS. 2B and 2D) longitudinally extend along sides of the housing 140 and cooperatively direct a flow of air into and out of the elongate airflow assembly 110. The plurality of intake slots 142 are included in the first shell 150 at three sides and form airflow entrances for the plurality of fans 180. The plurality of exit vents 144 form airflow exits for the plurality of fans 180 and are included in the second shell 170 at one side. To further describe aspects related to air flow, specific reference is made to FIG. 2D.

FIG. 2D illustrates a portion of the elongate airflow assembly 110 between the cut line 2D-2D of FIG. 2A and the first end 112. At this portion, the elongate airflow assembly 110 has a first fan 181 of the plurality of fans 180, which includes a first fan axis 101, and a first plurality of blades 191, and portions of the pluralities of intake slots 142 and exit vents 144 that respectively form, at least in part, an airflow entrance and an airflow exit for the first fan 181. The plurality of blades 191 are arranged to form a circular cross-sectional shape around the first fan axis 101. The first fan 181 is configured such that a first motor (not shown) of the one or more motors 96 (not shown in FIG. 2D) moves the plurality of blades 191 in the first rotational direction 6 (e.g., a clockwise direction on a side of the first end cap 120 that is visible in FIG. 2D) about the first fan axis 101. When the plurality of blades 191 are rotated, air flows into the elongate airflow assembly 110 at a range of airflow directions that includes first airflow directions 1, 3, and 4 and then flows out of the elongate airflow assembly 110 at the second airflow direction 2. In more detail, air enters the elongate airflow assembly 110 through the plurality of intake slots 142 of the housing 140 and travels through air filters (not shown) positioned adjacent to the plurality of intake slots 142, travels into the first fan 181, travels out of the first fan 181, and then exits the elongate airflow assembly 110 through the plurality of exit vents 144 of the housing 140 as a generally planar sheet of air. Additionally, the range of airflow directions refers to multiple airflow directions at which air may flow into the elongate airflow assembly 110 throughout the plurality of intake slots 142 and includes the first airflow direction 1, a third airflow direction 3, and a fourth airflow direction 4, which are all generally perpendicular to the second airflow direction 2 (e.g., within ±45 degrees of perpendicular, in the illustrated embodiment).

In example aspects, the housing 140, the first end cap 120, and the second end cap 130 are configured such that the housing 140, as well as components therein may be rotated about the central longitudinal axis 100, which extends through a center of the housing 140 and between the first and second ends 112, 114. As previously discussed, the first and second end caps 120, 130 are configured such that the first and second cylindrical portions 124, 134 are moveable independent of the first and second perimeter portions 123, 133. Further, because the housing 140 is connected to the first and second end caps 120, 130 at the first and second cylindrical portions 124, 134, the housing 140 is also moveable independent of the first and second perimeter portions 123, 133. Thus, when the first and second perimeter portions 123, 133 have a relatively fixed position (e.g., when the elongate airflow assembly 110 is mounted (which includes being hung)), the housing 140 may be rotated about the central longitudinal axis 100 to change a position of the plurality of exit vents 144 relative to the first and second perimeter portions 123, 133, which, in turn, changes the orientation of the air that flows out of the elongate airflow assembly 110.

On account of the aforementioned aspects and/or features of the housing 140, the first end cap 120, the second end cap 130, and the plurality of fans 180, the elongate airflow assembly 110 provides a flow of air in a selectable and/or adjustable airflow direction. Referring again to FIG. 2D for further explanation, the elongate airflow assembly 110 is depicted in an upright position, and a first aperture 127a, a second aperture 127b, and a third aperture 127c of the first plurality of mounting components 126 are identified for reference. Moreover, the housing 140 is depicted in a position, which is relative the first and second perimeter portions 123, 133, at which the plurality of intake slots 142 and the first aperture 127a are generally aligned (e.g., within ±20 degrees of alignment) such that a straight line extending from the central longitudinal axis 100 along a first plane (not identified) that is parallel to a plane formed by the cut line 2D-2D (and a side of first perimeter portion 123 that is visible in FIG. 2D) intersects or nearly intersects with both the plurality of intake slots 142 and the first aperture 127a. The plurality of exit vents 144 and the second aperture 127b are also generally aligned in this same manner. Moreover, the second airflow direction 2 (i.e., the direction at which air flows out of the elongate airflow assembly 110) is generally parallel (e.g., within ±20 degrees of parallel) to a line extending from the central longitudinal axis 100 that intersects or nearly intersects with the plurality of exit vents 144 and the second aperture 127b.

Continuing, a position of the housing 140 relative to the first and second perimeter portions 123, 133 may be changed by rotating the housing 140 about the central longitudinal axis 100 in either the first rotational direction 6 or a second rotational direction 7, which is opposite the first rotational direction 6. As a result of rotating the housing 140, a position of the plurality of exit vents 144 and the second airflow direction 2 also changes, which, in turn, changes and/or adjusts a direction at which air flows out of the elongate airflow assembly 110. For example, rotating the housing 140 in the second rotational direction 7 such that the plurality of intake slots 142 are generally aligned with the third aperture 127c in a manner that is the same as and/or similar to how they are generally aligned with the first aperture 127a in FIG. 2D, would position the plurality of exit vents 144 and the second airflow direction 2 more towards or at a lowermost side of the elongate airflow assembly 110, which, in turn, provides a flow of air in more downward direction. As another example, rotating the housing 140 in the first rotational direction 6 such that the plurality of exit vents 144 are generally aligned with the third aperture 127c in a manner that is the same as and/or similar to how they are generally aligned with the second aperture 127b in FIG. 2D, would position the second airflow direction 2 more towards or at a front side of the elongate airflow assembly 110, which, in turn, provides a flow of air in more upward direction. This adjustability allows the operator to control the angle and direction of the planar sheet of air flow produced by the elongate airflow assembly 110 to match the needs of the plants adjacent thereto.

Figure 2F:
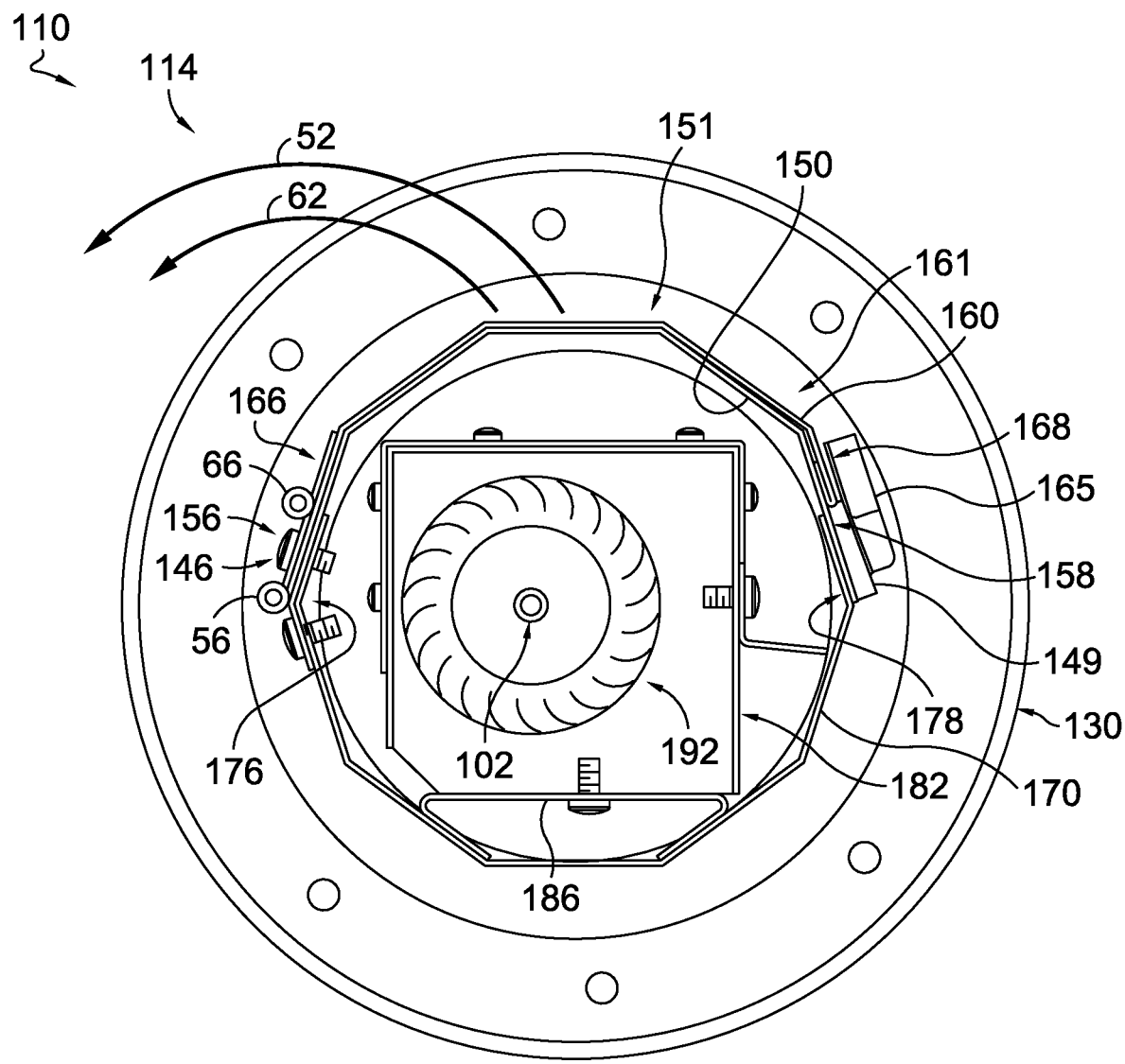
FIG. 2F is a cross-sectional view of the elongate airflow assembly of FIG. 2A taken along the line 2F-2F of FIG. 2A.

In additional aspects related to air flow and with further reference to FIG. 2F, which is a cross sectional view taken at the cut line 2F-2F of FIG. 2A, one or more fans of the plurality of fans 180 may be configured such that variable volumes of airflow are provided at different portions of the elongate airflow assembly 110. In FIG. 2F, the elongate airflow assembly 110 has a second fan 182 of the plurality of fans 180 that includes a second fan axis 102 and a second plurality of blades 192. While the second fan 182 operates similarly to the first fan 181, and air flows through the elongate airflow assembly 110 in a similar fashion, the first fan 181, the second fan 182, and/or any one of the plurality of fans 180 may be configure to rotate its plurality of blades at variable speeds and may be further configured to operate independently. For example, the first and the second fans 181, 182 may be set at different speed settings in which the first plurality of blades 191 and the second plurality of blades 192 rotate at different speeds. As a result, a volume of airflow provided by the elongate airflow assembly 110 at a portion that includes the first fan 181 is different than a volume of airflow provided at a portion that includes the second fan. In further aspects, the first fan 181, the second fan 182, and/or any one of the plurality of fans 180 may be a cross-flow fan.

Aspects and features of the first shell 150, the second shell 170, and the filter cage 160 that are related to their movability and/or coupling will now be discussed. Beginning with the first and second shells 150, 170, they are configured such that the first shell 150 is releasably secured in a closed position (e.g., FIGS. 1A-2F) and, when unsecured, is moveable to and between the closed position and an open position (e.g., FIGS. 3A, 3B). As shown in FIGS. 2A and 2B, the housing 140 includes a first housing latch 148 proximate the first end 112 that is coupled to the first end portion 121 and a second housing latch 149 proximate the second end 114 that is coupled to the second end portion 131. The first and second housing latches 148, 149 are configured to releasably secure the first shell 150 in the closed position. That is, the first and second housing latches 148, 149 can be positioned to extend over a portion of the first shell 150 in a manner that prevents the first shell 150 from moving out of the closed position and can be repositioned to not extend over any portion of the first shell 150 such that the first shell 150 is moveable out of the closed position. Additionally, the housing 140 further includes a first filter latch 163 and a second filter latch 165 that are coupled to the first shell 150 at a first closure portion 158. The first and second filter latches 163, 165 are configured to releasably secure the filter cage 160 and operate in a same manner as the first and second housing latches 148, 149.

As can be seen in FIG. 2C, the housing 140 also includes a first hinge 145 proximate the first end 112, a second hinge 146 proximate the second end 114, and a third hinge 147 midway between the first and second ends 112, 114. The first, second, and third hinges 145, 146, 147 are configured to hingedly couple the first and second shells 150, 170 such that the first shell 150 is hingedly moveable. Moreover, each of the first, second, and third hinges 145, 146, 147 are attached to a first hinged portion 156 of the first shell 150 and a second hinged portion 176 of the second shell 170. Further, the first, second, and third hinges 145, 146, 147 are also configured to hingedly couple the first shell 150 and the filter cage 160 such that the filter cage 160 is hingedly moveable. As such, each of the first, second, and third hinges 145, 146, 147 are also attached to a filter hinged portion 166 of the filter cage 160.

Referring to FIG. 2F, numeral 151 designates a first position of the first shell 150 (e.g., closed position, like in FIGS. 2A-2F) and numeral 161 designates a first filter position of the filter cage 160 (e.g., closed position, like in FIGS. 2A-2F). As shown, when the first shell 150 is in the first position 151, the first closure portion 158 of the first shell 150 is adjacent to a second closure portion 178 of the second shell 170, and the second housing latch 149 (and also the first housing latch 148) is positionable to extend over a portion of the first shell 150 at the first closure portion 158 to secure it in the first position 151. Moreover, when the filter cage 160 is in the first filter position 161, a filter closure portion 168 of the filter cage 160 is adjacent to the first closure portion 158 of the first shell 150, and the second filter latch 165 (and also the first filter latch 163) is positionable to extend over a portion of the filter cage 160 at the filter closure portion 168 to secure it in the first filter position 161.

Staying with FIG. 2F, the second hinge 146 includes a shell joint 56 proximate a first hinged portion 156 of the first shell 150 and a second hinged portion 176 portion of the second shell 170. The shell joint 56 is configured to be a pivot point about which the first shell 150 is hingedly moveably relative to the second shell 170. The second hinge 146 also includes a filter joint 66 proximate a filter hinged portion 166 of the filter cage 160 and the first hinged portion 156 of the first shell 150. The filter joint 66 is configured to be a pivot point about which the filter cage 160 is hingedly moveable relative to the first shell 150. Although not shown or identified, each of the first and third hinges 145, 147 also include a shell joint and a filter joint that respectively have the same features as the shell joint 56 and the filter joint 66.

Figure 3B:
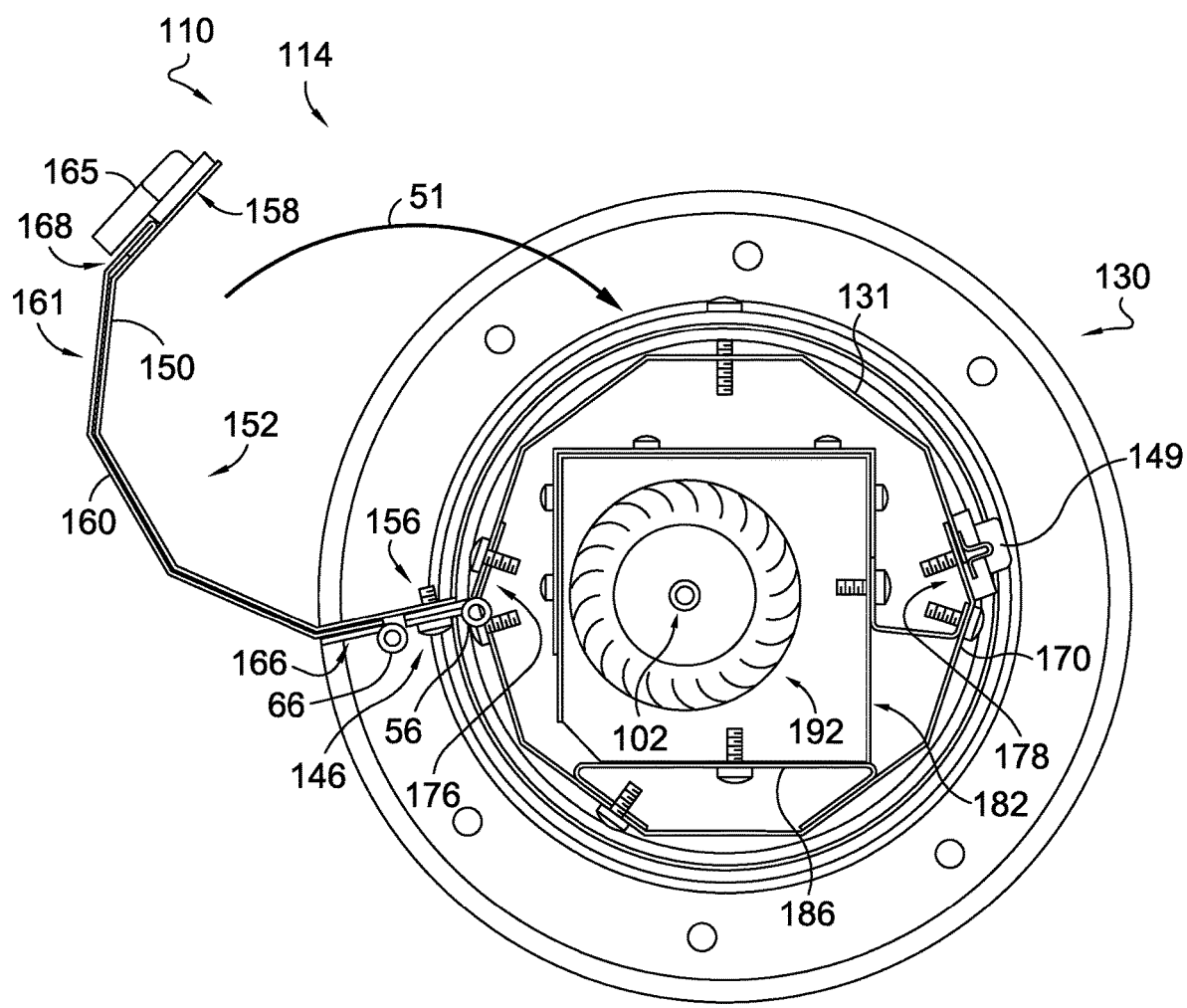
FIG. 3B is a cross-sectional view of the elongate airflow assembly of FIG. 2A taken along line 3B-3B of FIG. 3A.

With additional reference to FIGS. 3A and 3B, in example aspects, the first shell 150 is moveable to and between the first position 151 and a second position 152 (e.g., open). In FIGS. 3A and 3B, the elongate airflow assembly 110 is depicted with the first shell 150 in the second position 152. FIG. 3A is a top front perspective view, and FIG. 3B is a cross sectional view taken at the cut line 3B-3B of FIG. 3A, which is made at the same location on the elongate airflow assembly 110 as the cut line 2F-2F of FIG. 2A. Thus, FIG. 3B-3B illustrates the same portion of the elongate airflow assembly 110 as FIG. 2F but with the first shell 150 in the second position 152. Further, in FIG. 2F, an arrow 52 illustrates movement of the first shell 150 in a second shell hinged direction (e.g., opening direction), and similarly, an arrow 51 in FIG. 3B illustrates movement of the first shell 150 in a first hinged direction (e.g., closing direction).

As shown in FIG. 3B, when the first shell 150 is in the second position 152, the first closure portion 158 of the first shell 150 is no longer adjacent to and is spaced apart from the second closure portion 178 of the second shell 170. Moreover, due to the manner in which the filter cage 160 is coupled and releasably secured with the first shell 150, movement of the first shell 150 in the first and second shell hinged directions 51, 52 results in movement of the filter cage 160, although a position of the filter cage 160 relative to the first shell 150 is unchanged. Thus, in FIG. 3B, the filter cage 160 is still in the first filter position 161, and the filter closure portion 168 of the filter cage 160 is adjacent to the first closure portion 158 of the first shell 150.

Figure 4A:
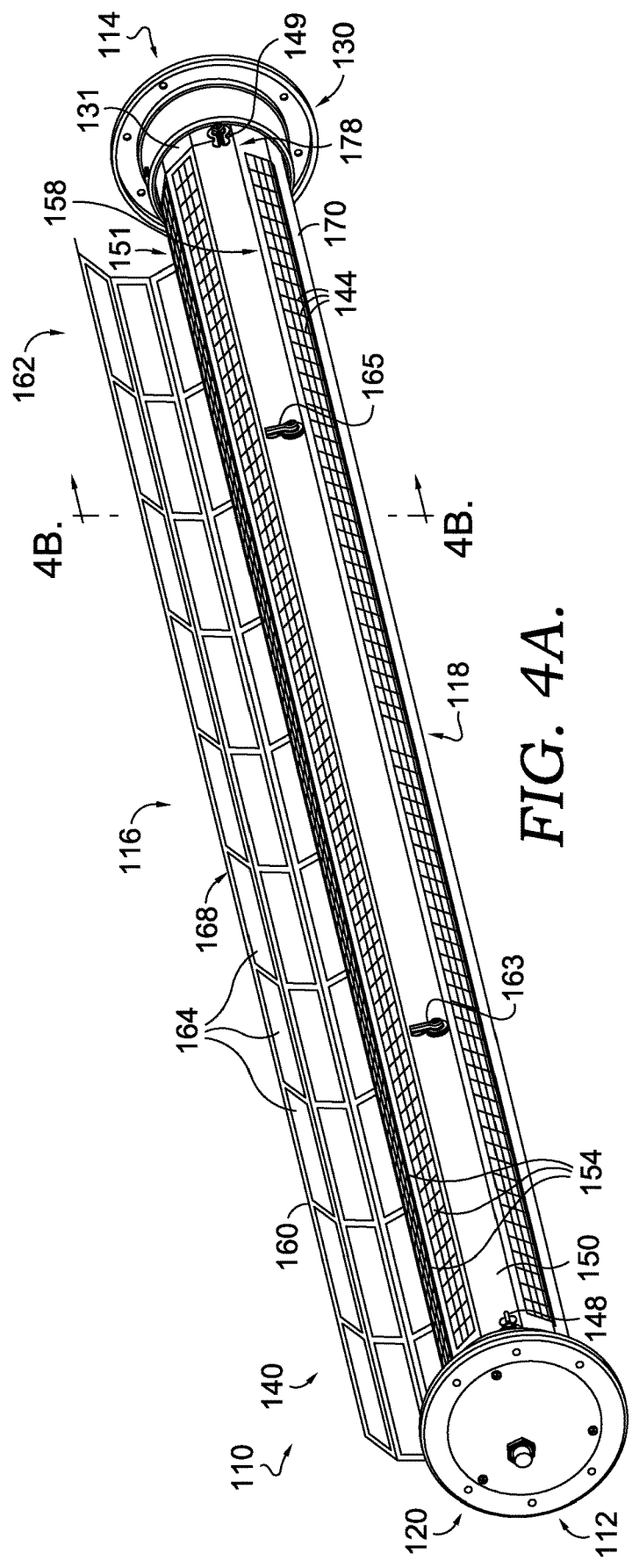
FIG. 4A is a top front perspective view of the elongate airflow assembly of FIG. 2A depicting a filter cage in an open position and the first shell in a closed position.
Figure 4B:
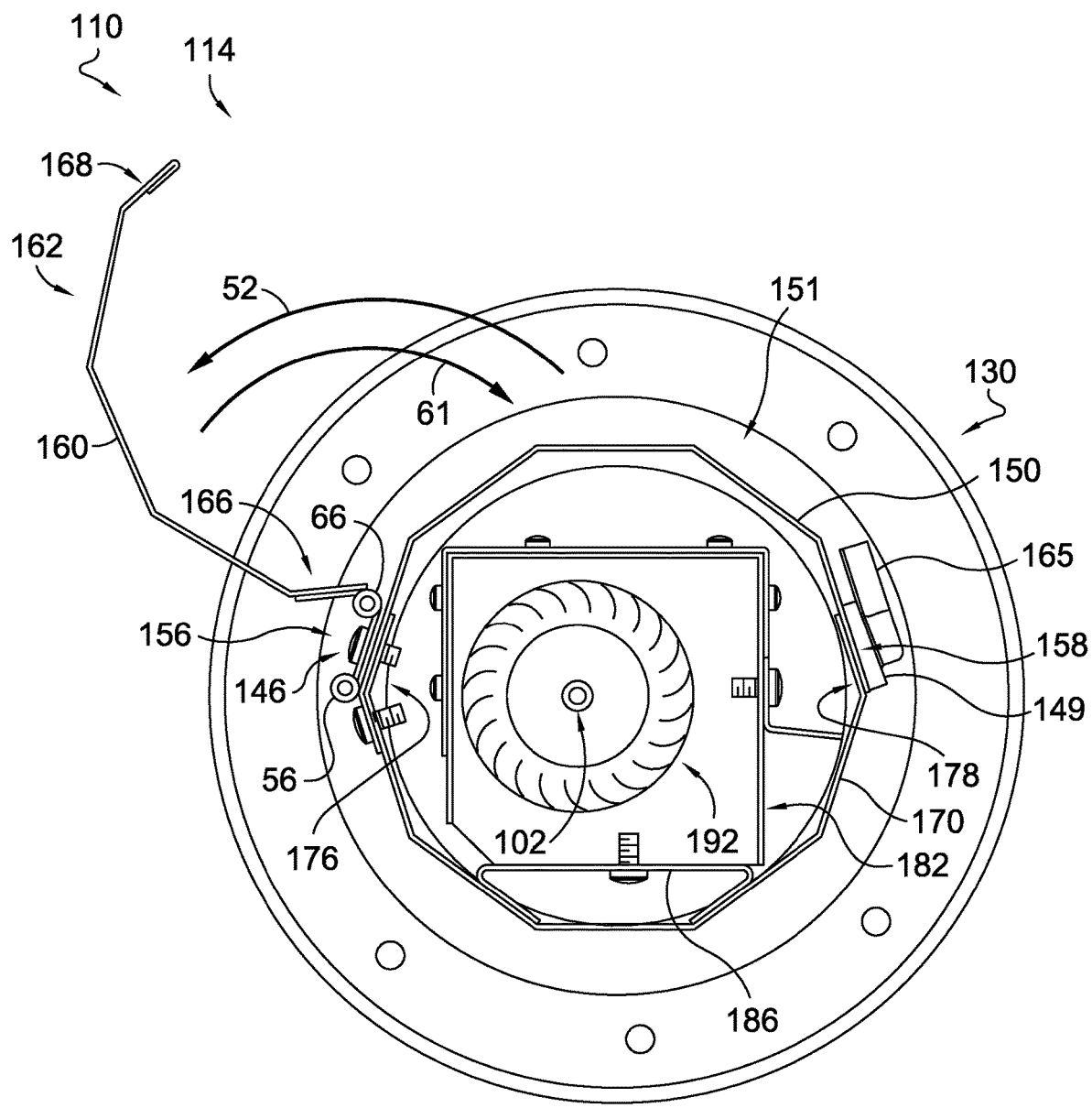
FIG. 4B is a cross-sectional view of the elongate airflow assembly of FIG. 2A taken along line 4B-4B of FIG. 4A.

Continuing with FIG. 2F, but with further reference to FIGS. 4A and 4B, in example aspects, the filter cage 160 is moveable to and between the first filter position 161 and a second filter position 162 (e.g., open). In FIGS. 4A and 4B, the elongate airflow assembly 110 is depicted with the filter cage 160 in the second filter position 162 and the first shell 150 in the first position 151. FIG. 4A is a top front perspective view, and FIG. 4B is a cross sectional view taken at the cut line 4B-4B of FIG. 4A, which is made at the same location on the elongate airflow assembly 110 as the cut lines 2F-2F of FIG. 2A and 3B-3B of FIG. 3A. Thus, FIG. 4B illustrates the same portion of the elongate airflow assembly 110 as FIG. 2F and FIG. 3B but with the filter cage 160 in the second filter position 162 and the first shell 150 in the first position 151. Moreover, in FIG. 2F, an arrow 62 illustrates movement of the filter cage 160 in a second filter hinged direction (e.g., opening direction), and similarly, an arrow 61 in FIG. 4B illustrates movement of the filter cage 160 in a first filter hinged direction (e.g., closing direction). Further, the arrow 52 again depicts movement of the first shell 150 in the second shell hinged direction 52 since, when the filter cage 160 is in the second filter position 162, the first shell 150 is movable in the second shell hinged direction 52.

As can be seen in FIG. 4B, when the filter cage 160 is in the second filter position and the first shell 150 is in the first position 151, the filter closure portion 168 is no longer adjacent to and is spaced apart from the first closure portion 158 of the first shell 150. Moreover, the first closure portion 158 of the first shell 150 is adjacent to the second closure portion 178 of the second shell 170.

On account of the aforementioned aspects and/or features of the first and second shells 150, 170, the filter cage 160, the first, second, and third hinges 145, 146, 147, and the first and second housing and filter latches 148, 149, 163, 165, the housing 140 provides convenient access to internal components of the elongate airflow assembly 110 for cleaning, maintenance, repair, and the like. In one example and using FIGS. 3A and 4A for reference, the first and second housing latches 148, 149 can quickly be positioned to unsecure the first shell 150, which can then be moved in the second shell hinged direction 52 to the second position 152 to access the internal compartment 141. From there, the plurality of fans 180 and one or more motors 196 of the plurality of fans 180 can be cleaned, repaired, replaced and the like. In another example, the first and second filter latches 163, 165 can be quickly positioned to unsecure the filter cage 160, which can then be moved in the second filter hinged direction 62 to replace and/or clean an air filter (not shown). In yet another example, the first shell 150 and the filter cage 160 can be moved separately such that a plurality filter slots 164 and/or a plurality of housing slots 154, which collectively form the plurality of intake slots 142, can be cleaned, repaired, replaced, and the like.

Additional aspects herein contemplate that elongate airflow assembly 110 is configured to be suitable for a variety of grow environments. In such aspects, the housing 140, the first end cap 120, the second end cap 130, their respective components, and/or any combination thereof may be configured to be corrosion, water, moisture resistance, and/or ultraviolet light resistant. As such, the housing 140, the first end cap 120, the second end cap 130, their respective components, and/or any combination thereof may be constructed of aluminum, stainless steel, galvanized powder coated steel, plastic, or some other material (e.g., polyvinyl chloride (PVC)) that is resistant to corrosion, water, and/or moisture.

Figure 5:
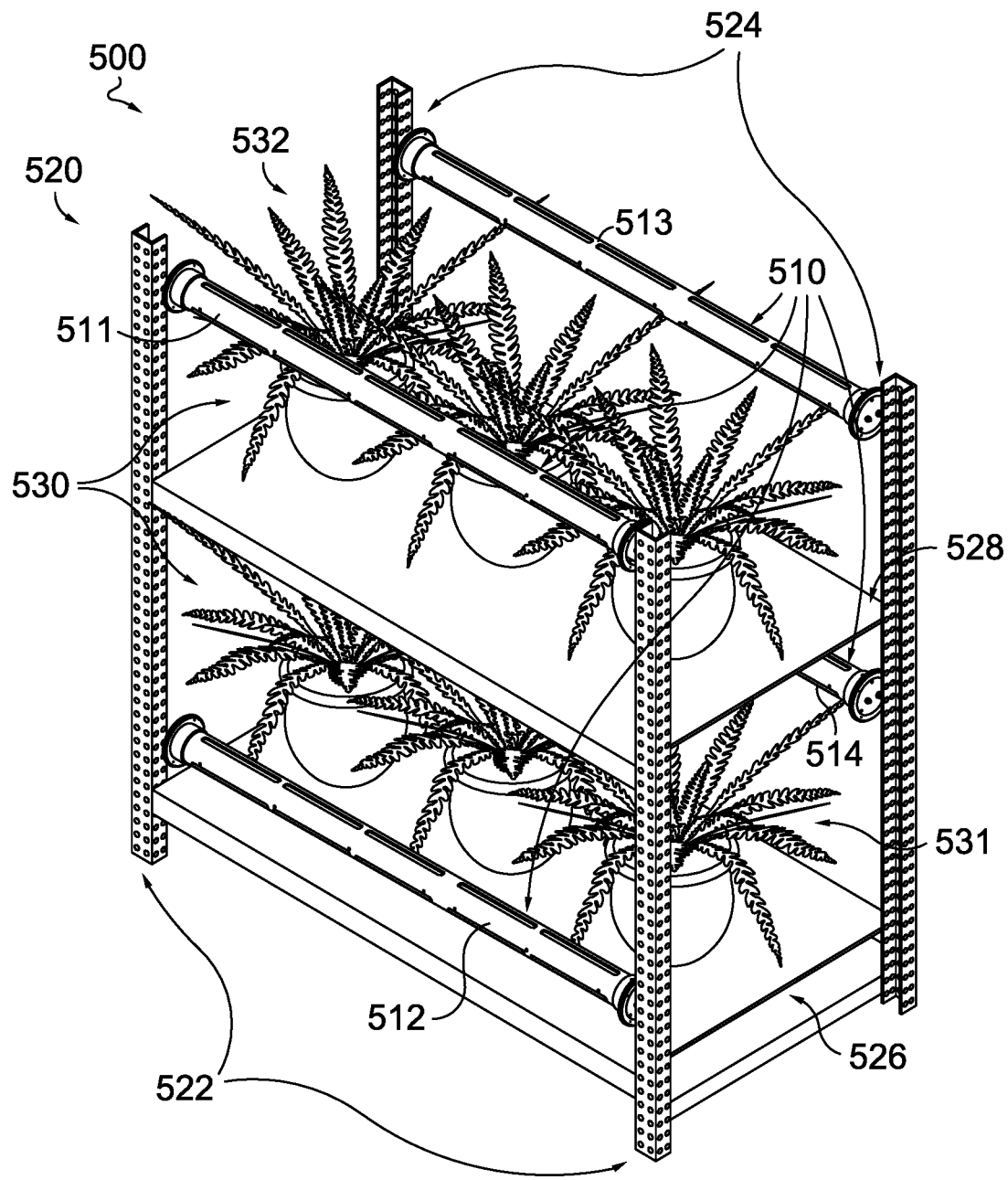

FIG. 5 is a perspective view and shows an improved plant cultivation system 500 that is configured to optimize and/or improve growing conditions of an indoor environment in which plants are grown. The improved plant cultivation system 500 includes a plurality of elongate airflow assemblies 510, a grow rack 520, and one or more sets of plants 530. In the example of FIG. 1, the plurality of elongate airflow assemblies 510 includes a first elongate airflow assembly 511, a second elongate airflow assembly 512, a third elongate airflow assembly 513, and a fourth elongate airflow assembly 514, each of which may have the same components, aspects, features or combinations thereof of the elongate airflow assemblies 10, 110. The grow rack 520 includes a first pair of posts 522, a second pair of posts 524, a bottom shelf 526 and a top shelf 528. The first and second pairs of posts 522, 524 are configured such that each post is coupled to a corner of the bottom shelf 526 and a corner of the top shelf 528 in a manner that secures the bottom and top shelves 526, 528 into a respective position in the grow rack 520. Further, the one or more sets of plants 530 includes a first set of plants 531 that are on the bottom shelf 526 and a second set of plants 532 that are on the top shelf 528.

Additionally, each post of the first and second pairs of posts 522, 524 is also configured to couple with an end of one or more of the first, second, third, and fourth elongate airflow assemblies 511, 512, 513, 514. As such, the first and second elongate and airflow assemblies 511, 512 are mounted to the grow rack 520 between the first pair of posts 522 at their respective first and second ends, and likewise, the third and fourth elongate airflow assemblies 513, 514 are mounted to the grow rack 520 between the second pair of posts 524. Moreover, the first, second, third, and fourth elongate airflow assemblies 511, 512, 513, 514 and the first and second pairs of posts 522, 524 are configured such that each of the first, second, third, and fourth elongate airflow assemblies 511, 512, 513, 514 is selectively secured at a desired vertical position in the grow rack 520 and may be demounted, remounted, and/or secured at a different vertical position. Accordingly, the first, second, third, and fourth elongate airflow assemblies 511, 512, 513, 514 in combination with the grow rack 520 may be utilized to provide controlled air flow to the first and second sets of plants 531, 532, which, in turn, allows for a moisture level of and/or water that is on the first and second plants 531, 532 to be reduced. Further, the first, second, third, and fourth elongate airflow assemblies 511, 512, 513, 514 are configured to operate in a small and/or spatially constrained area, while using minimum power. As such, the improved plant cultivation system 500 may be utilized to optimize and/or improve growing conditions for plants contained in an indoor environment that has spatial constraints and in a manner that is energy efficient. In an alternate embodiment than depicted in FIG. 5, several rows of plants may be provided on each shelf and a single elongate airflow assembly may be associated with each shelf at a vertical height to direct a consistent sheet of air at a uniform low velocity air flow across the several rows of plants underneath the canopy.

Figure 6:
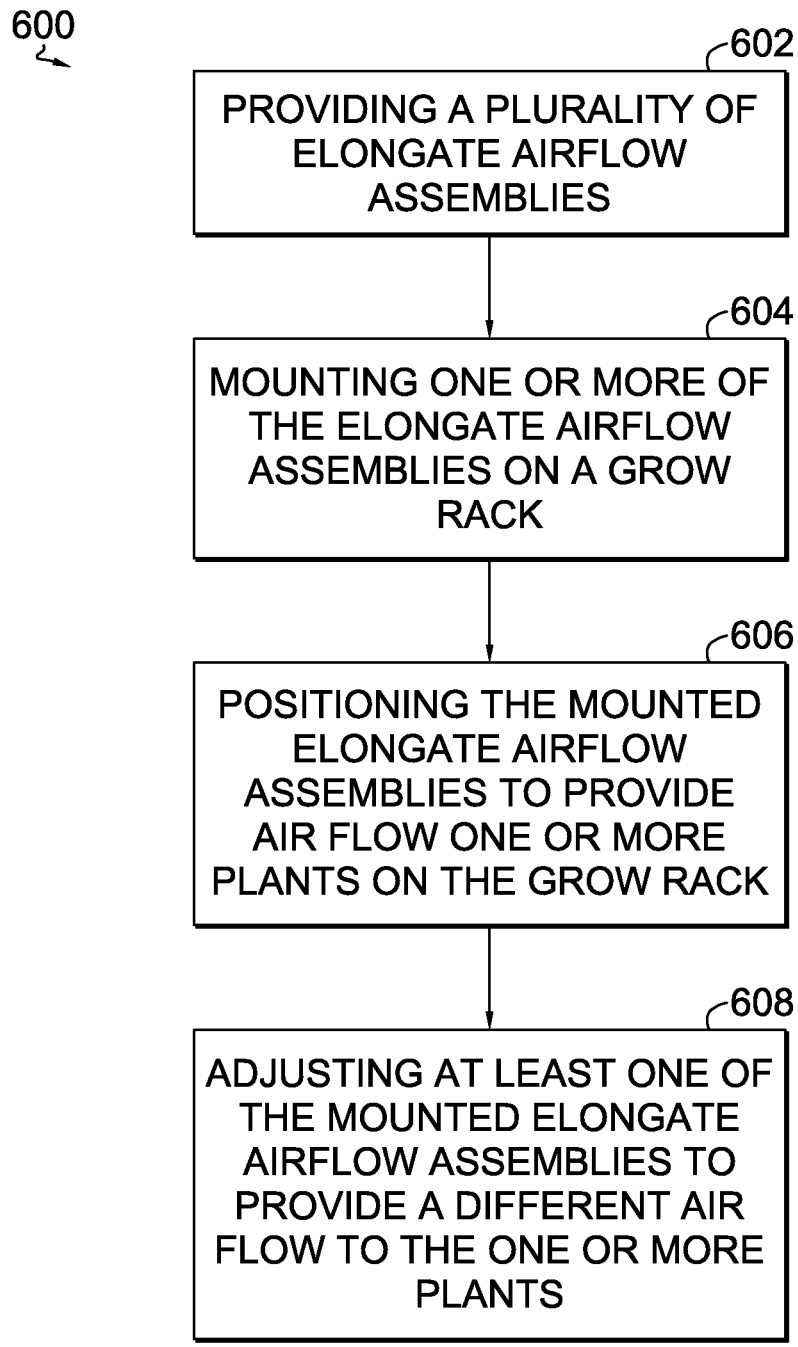

FIG. 6 illustrates a flow diagram of an example method 600 of improved plant cultivation. As shown, at block 602, a first step of the method 600 is depicted, which is providing a plurality of elongate airflow assemblies, such as the elongate airflow assemblies 10, 110. At block 604, a second step of the method 600 is depicted, which includes mounting one or more of the elongate airflow assemblies 10, 110 on a grow rack, such as via the mounting components 26 and/or the first and second pluralities of mounting components 126, 136.

Block 606 depicts a third step of the method 600 and includes positioning the mounted elongate airflow assemblies 10, 110 to provide airflow to one or more plants on the grow rack, such as by rotating the housing 16, 140 about the central longitudinal axis 100 in the first and/or second rotational directions 6, 7. At block 608, a fourth step of the method is depicted, which includes adjusting at least one of the mounted elongate airflow assemblies 10, 110 to provide a different air flow to one or more plants, such as by rotating the housing 16, 140 about the central longitudinal axis 100 a second time in the first and/or second rotational directions 6, 7 such that a position of the plurality of exit vents 20, 144 relative to the first and/or second perimeter portions 23, 25, 123, 133 of one of the mounted elongate airflow assemblies 10, 110 is different than at least one other mounted elongate airflow assemblies.

Accordingly, the present invention discloses an elongate airflow assembly that provides controlled airflow in a manner that is suitable for improved cultivation of plants. The elongate airflow assembly may be included in a plurality of elongate airflow assemblies and may be used as part of a system and/or method of improved plant cultivation. Many variations can be made to the illustrated embodiment of the present invention without departing from the scope of the present invention. Such modifications are within the scope of the present invention. For example, a housing could include a plurality of intake slots and/or a plurality of exit vents that have a different configuration (e.g., located at a different position on the housing, be formed of one or more discrete portions, etc.). Another modification would be changing the orientation of the air intake flow to the air exit flow to be any angle that permits the creation of a suitable air exit flow. Other modifications would be within the scope of the present invention.

From the foregoing it will be seen that this invention is one well adapted to attain all ends and objects hereinabove set forth together with the other advantages which are obvious and which are inherent to the method and apparatus. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. An elongate airflow assembly comprising:
   a first end and a second end positioned opposite the first end;
   a housing extending between the first and second ends and defining a central longitudinal axis, the housing comprising a first shell including a plurality of intake slots and a second shell including a plurality of exit vents; and a plurality of fans positioned within the housing and including a plurality of blades that are rotatable about a fan axis in a first rotational direction, wherein, when the plurality of blades are rotated in the first rotational direction, air flows through the plurality of intake slots in a first airflow direction generally tangential to the central longitudinal axis and flows through the plurality of exit vents in a second airflow direction generally tangential to the longitudinal axis.

2. The elongate airflow assembly of claim 1, wherein the housing is rotatable about the central longitudinal axis that extends through a center of the housing and between the first and second ends.

3. The elongate airflow assembly of claim 2, wherein the housing is rotatable about the central longitudinal axis in the first rotational direction and a second rotational direction that is opposite the first rotational direction.

4. The elongate airflow assembly of claim 2, wherein the first end comprises a first end cap including a first perimeter portion, and wherein a position of the first perimeter portion is independent of a rotational movement of the housing about the central longitudinal axis.

5. The elongate airflow assembly of claim 4, wherein the first perimeter portion comprises a plurality of mounting components that are configured to couple with a grow rack.

6. The elongate airflow assembly of claim 1, wherein the housing comprises a cross sectional shape, wherein the cross sectional shape is a rectangle.

7. The elongate airflow assembly of claim 6, wherein the first and second shells are hingedly coupled and are configured such that the first shell is moveable in a first direction and a second direction.

8. The elongate airflow assembly of claim 7, wherein the first shell is hingedly moveable to and between a first position and a second position.

9. The elongate airflow assembly of claim 8, wherein, when the first shell is in the first position, a first closure portion of the first shell is adjacent to a second closure portion of the second shell.

10. The elongate airflow assembly of claim 6, wherein the housing comprises a filter cage that is configured to be positionable overtop the first shell.

11. The elongate airflow assembly of claim 10, wherein the filter cage and the first shell are hingedly coupled and are configured such that the filter cage is moveable independent of the first shell in an opening direction and a closing direction.

12. The elongate airflow assembly of claim 11, wherein the filter cage is moveable to and between a first filter position and a second filter position, and wherein the first shell is moveable to and between a first position and a second position.

13. The elongate airflow assembly of claim 12, wherein, when the filter cage is in the second filter position and the first shell is in the second position, an internal compartment of the housing is accessible.

14. A method of improving plant cultivation, the method comprising:

providing a plurality of elongate airflow assemblies, each of the plurality of elongate air flow assemblies comprising:
(1) a first end and a second end positioned opposite the first end;
(2) a housing extending between the first and second ends and defining a central longitudinal axis, the housing comprising a first shell including a plurality of intake slots and a second shell including a plurality of exit vents; and
(3) a plurality of fans positioned within the housing and including a plurality of blades that are rotatable about a fan axis in a first rotational direction, wherein, when the plurality of blades are rotated in the first rotational direction, air flows through the plurality of intake slots in a first airflow direction generally tangential to the central longitudinal axis and flows through the plurality of exit vents in a second airflow direction generally tangential to the longitudinal axis;

mounting each of the elongate airflow assemblies of the plurality of elongate airflow assemblies to a grow rack; and positioning the plurality of elongate airflow assemblies on the grow rack such that growing conditions for one or more sets of plants included on the grow rack can be optimized by controlling the volume of air flowing across the one or more sets of plants.

15. The method of improving plant cultivation of claim 14, wherein the plurality of exit vents of each of the plurality of elongate airflow assemblies of the plurality of airflow assemblies is configured to output a consistent sheet of air at uniform velocity in a direction that corresponds to a position of the plurality of exit vents and directing the sheet of air across the one or more sets of plants underneath the plant canopy.

16. The method of improving plant cultivation of claim 15 further comprising rotating the housing of a first elongate airflow assembly of the plurality of elongate airflow assemblies to change the position of the plurality of exit vents such that the first elongate airflow assembly provides a flow of air in a direction that is generally horizontal across several rows of plants.

17. A system of improved plant cultivation, the system comprising:

a grow rack having a first pair of posts, a second pair of posts, and one or more shelves;

one or more sets of plants positioned on the one or more shelves of the grow rack; and a plurality of elongate airflow assemblies mounted to the grow rack, each elongate airflow assembly being coupled to the first pair of posts or the second pair of posts and configured to provide controlled airflow to at least one plant of the one or more sets of plants, each of the plurality of elongate air flow assemblies comprising:
(1) a first end and a second end positioned opposite the first end;
(2) a housing extending between the first and second ends and defining a central longitudinal axis, the housing comprising a first shell including a plurality of intake slots and a second shell including a plurality of exit vents; and
(3) a plurality of fans positioned within the housing and including a plurality of blades that are rotatable about a fan axis in a first rotational direction, wherein, when the plurality of blades are rotated in the first rotational direction, air flows through the plurality of intake slots in a first airflow direction generally tangential to the central longitudinal axis and flows through the plurality of exit vents in a second airflow direction generally tangential to the longitudinal axis.

18. The system of improved plant cultivation of claim 17, wherein the housing of each elongate airflow assembly of the plurality of elongate airflow assemblies is rotatable and is configured such that rotating the housing adjusts a direction at which the controlled air flow is provided to the at least one plant of the one or more sets of plants.

19. The system of improved plant cultivation of claim 17, wherein the plurality of elongate airflow assemblies comprises a first elongate airflow assembly, wherein the housing of the first elongate airflow assembly comprises a cross sectional shape that is a rectangle.

20. The system of improved plant cultivation of claim 17, wherein the plurality of elongate airflow assemblies comprises a first elongate airflow assembly, wherein the first and second shells of the housing of the first elongate airflow assembly are hingedly coupled and are configured such that the first shell is moveable in a first direction and a second direction.

* * * * *